(12) United States Patent
Jung et al.

(10) Patent No.: US 11,564,276 B2
(45) Date of Patent: Jan. 24, 2023

(54) METHOD AND APPARATUS FOR MANAGING INFORMATION ABOUT RRC CONNECTION IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 17/226,658

(22) Filed: Apr. 9, 2021

(65) Prior Publication Data

US 2021/0321478 A1 Oct. 14, 2021

(30) Foreign Application Priority Data

Apr. 9, 2020 (KR) ......................... 10-2020-0043657
Aug. 4, 2020 (KR) ......................... 10-2020-0097672

(51) Int. Cl.
*H04W 76/19* (2018.01)
*H04W 76/18* (2018.01)
(Continued)

(52) U.S. Cl.
CPC .......... *H04W 76/19* (2018.02); *H04B 17/318* (2015.01); *H04W 24/10* (2013.01);
(Continued)

(58) Field of Classification Search
CPC ..... H04W 24/10; H04W 76/11; H04W 76/18; H04W 76/19; H04W 84/042; H04B 17/318
See application file for complete search history.

(56) References Cited

U.S. PATENT DOCUMENTS 7,228,459 B2 * 6/2007 Jiang ...................... H04L 69/00
714/43
2007/0026854 A1 * 2/2007 Nath ..................... H04W 24/08
455/423

(Continued)

OTHER PUBLICATIONS

Huawei et al., "CR for introducing MDT and SON", R2-2002003, 3GPP TSG RAN WG2 Meeting #109-e, Electronic meeting, Mar. 11, 2020.

(Continued)

*Primary Examiner* — Jean A Gelin
(74) *Attorney, Agent, or Firm* — Jefferson IP Law, LLP

(57) ABSTRACT

A terminal for transmitting a signal in a wireless communication system is provided. The terminal includes a transceiver, and at least one processor configured to start a timer when a Radio Resource Control (RRC) connection establishment procedure or an RRC connection resume procedure is initiated, identify that the timer is expired or that, while the timer is running, an integrity check failure indication is received from a lower layer, determine whether at least one of a first condition or a second condition is met, the first condition including a condition that the terminal has connection failure information available in an information container and a registered Public Land Mobile Network (PLMN) does not correspond to a PLMN identity included in the information container, and the second condition including a condition that a first cell identity of a current cell is not equal to a second cell identity stored in measurement result information about a cell where connection failure happened, in response to determining that at least one of the first condition or the second condition is met, set a count number about connection failure included in the information container to 0, and after determining whether at least one of the first condition or the second condition is met, clear contents included in the information container except for the count number about the connection failure.

20 Claims, 13 Drawing Sheets

(51) Int. Cl.
H04W 24/10 (2009.01)
H04B 17/318 (2015.01)
H04W 76/11 (2018.01)
H04W 84/04 (2009.01)

(52) U.S. Cl.
CPC ............ *H04W 76/11* (2018.02); *H04W 76/18* (2018.02); *H04W 84/042* (2013.01)

(56) References Cited

U.S. PATENT DOCUMENTS

| | | | | |
|---|---|---|---|---|
| 2010/0330920 | A1* | 12/2010 | Koskela | H04L 1/1825 455/67.11 |
| 2015/0045028 | A1* | 2/2015 | Singh | H04W 36/00837 455/436 |
| 2015/0065143 | A1* | 3/2015 | Hsu | H04W 36/18 455/437 |
| 2017/0223555 | A1 | 8/2017 | Lee et al. | |
| 2017/0257903 | A1 | 9/2017 | Kim et al. | |
| 2020/0092771 | A1 | 3/2020 | Ohlsson et al. | |
| 2021/0329543 | A1* | 10/2021 | Jin | H04W 48/12 |

OTHER PUBLICATIONS

"3GPP; TSG RAN; Radio Resource Control (RRC) protocol specification (Release 16)", 3GPP TS 38.331 V16.0.0, Apr. 6, 2020.
International Search Report dated Jul. 12, 2021, issued in International Patent Application No. PCT/KR2021/004503.

* cited by examiner

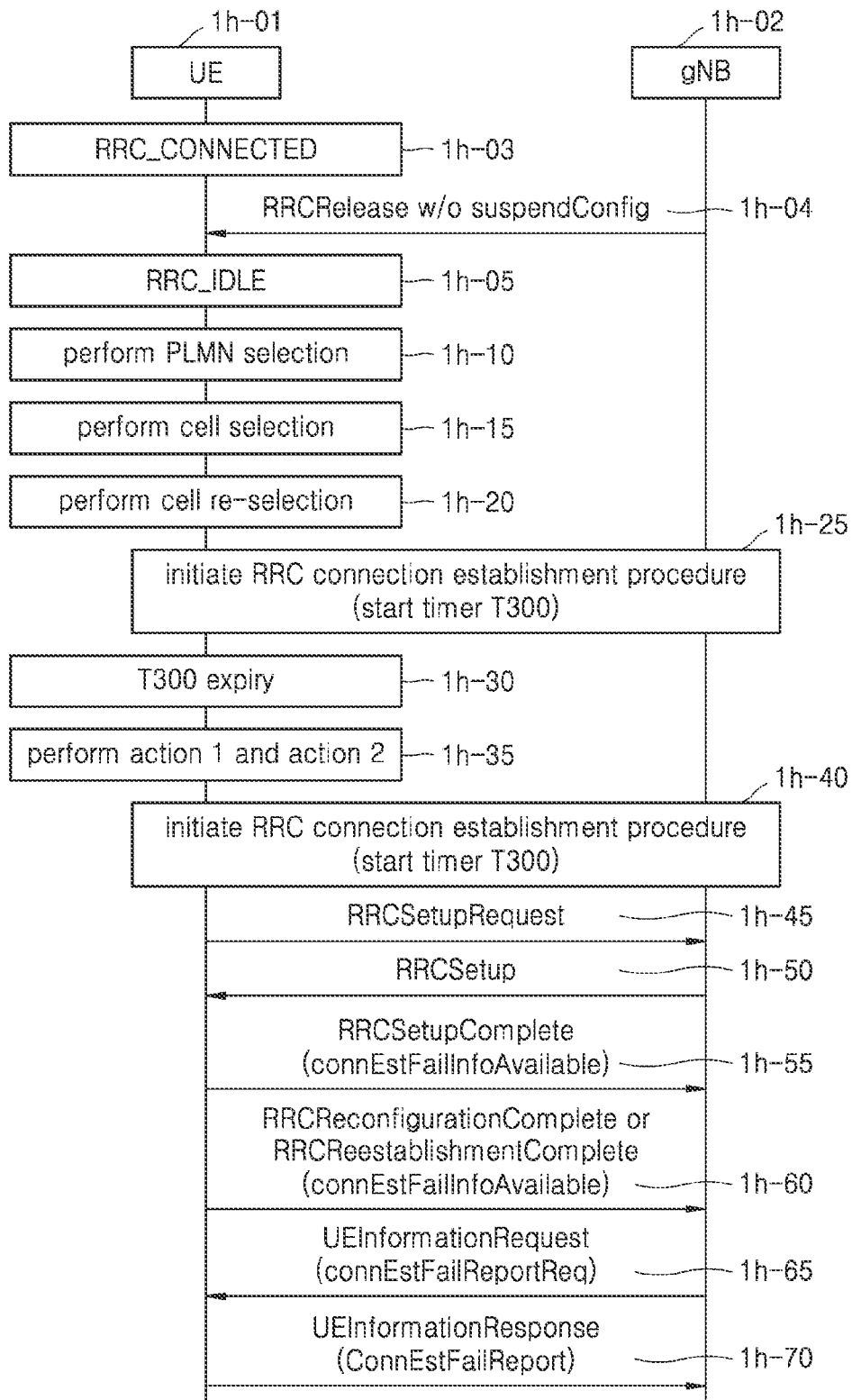

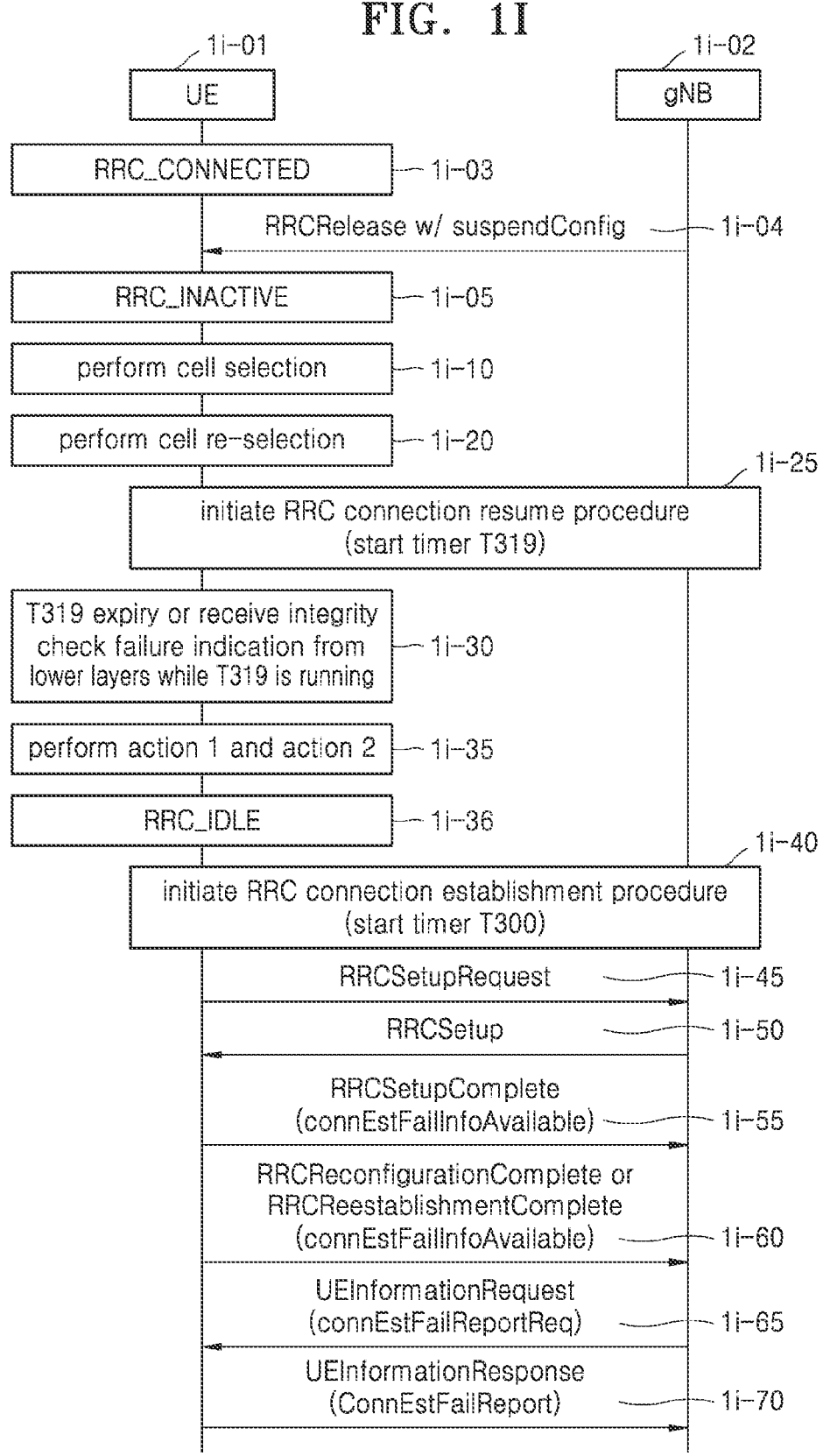

METHOD AND APPARATUS FOR MANAGING INFORMATION ABOUT RRC CONNECTION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0043657, filed on Apr. 9, 2020, in the Korean Intellectual Property Office, and of a Korean patent application number 10-2020-0097672, filed on Aug. 4, 2020, in the Korean Intellectual Property Office, the disclosure of each of which is incorporated by reference herein in its entirety.

BACKGROUND

1. Field

The disclosure relates to a method and apparatus for managing information about radio resource control (RRC) connection in a wireless communication system. More particularly, the disclosure relates to a method and apparatus for collecting and reporting RRC connection configuration and resume failure information.

2. Description of Related Art

To meet the exploding increase in demand for wireless data traffic due to the commercialization of a $4^{th}$ generation (4G) system and the increase of multimedia services, an improved $5^{th}$ generation (5G) communication system or a pre-5G communication system is being developed. This is one reason why 5G communication systems or pre-5G communication systems are called beyond 4G network communication systems or post long term evolution (LTE) systems.

In order to increase a data rate, 5G communication systems are being developed to be implemented in a super-high frequency band (millimeter wave (mmWave)), e.g., a band of 60 gigahertz (GHz). To reduce path loss of radio waves and increase a transfer distance of radio waves in an ultra-high-frequency band, in a 5G communication system, technologies for beamforming, massive multiple input multiple output (MIMO), full dimensional MIMO (FD-MIMO), array antenna, analog beam-forming, and large-scale antenna are being discussed.

Also, in order to improve system network performance for 5G communication systems, various technologies have been developed, e.g., evolved small cells, advanced small cells, cloud radio access networks (cloud-RAN), ultra-dense networks, device-to-device communication (D2D), wireless backhaul, moving networks, cooperative communication, coordinated multi-points (CoMP), and interference cancellation. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology is emerging, in which technology related to the IoT is combined with, for example, technology for processing big data through connection with a cloud server. In order to implement the IoT, various technological elements are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Various attempts are being made to apply 5G communication systems to the IoT network. For example, technologies, such as a sensor network, M2M communication, and MTC, are implemented by technologies, such as beamforming, MIMO, and array antenna, which are 5G communication technologies. The application of cloud-RAN as a big data processing technology described above may be an example of convergence of 5G communication technology and IoT technology.

As various services may be provided due to the development of wireless communication systems and the aforementioned technologies, in particular, a method for collecting and reporting RRC connection configuration and resume failure information is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method capable of effectively collecting and reporting radio resource control (RRC) connection configuration and resume failure information in a wireless communication system.

Additional aspects will be set forth in part in the description which follows and, in part, will be apparent from the description, or may be learned by practice of the presented embodiments of the disclosure.

In accordance with an aspect of the disclosure, a terminal for transmitting a signal in a wireless communication system is provided. The terminal includes a transceiver, and at least one processor configured to start a timer when an RRC connection establishment procedure or an RRC connection resume procedure is initiated, identify that the timer is expired or that, while the timer is running, an integrity check failure indication is received from a lower layer, determine whether at least one of a first condition or a second condition is met, the first condition including a condition that the terminal has connection failure information available in an information container and a registered Public Land Mobile Network (PLMN) does not correspond to a PLMN identity included in the information container, and the second condition including a condition that a first cell identity of a current cell is not equal to a second cell identity stored in measurement result information about a cell where connection failure happened, in response to determining that at least one of the first condition or the second condition is met, set a count number about connection failure included in the information container is 0, and after determining whether at least one of the first condition or the second condition is met, clear contents included in the information container except for the count number about the connection failure.

The information container may include connection failure report information and the PLMN identity, and the connection failure report information may include the count number about the connection failure and the measurement result information about the cell where the connection failure happened.

The PLMN identity and the measurement result information about the cell where the connection failure happened may be stored in the information container in response to the RRC connection establishment procedure or the RRC connection resume procedure failing.

The measurement result information about the cell where the connection failure happened may include at least one of a global cell identity, a tracking area code, reference signal received power (RSRP), or reference signal received quality (RSRQ).

The connection failure information may include at least one of connection establishment failure information or connection resume failure information.

The at least one processor may be further configured to transmit, to a base station (BS), an RRC setup request message in an idle mode or an RRC resume request message in an inactive mode, receive, from the BS, an RRC setup message, enter a connected mode, identify that the terminal has the connection failure information available in the information container and the registered PLMN corresponds to the PLMN identity included in the information container, transmit, to the BS, an RRC setup complete message including a first indicator indicating that the terminal has available connection failure information, receive, from the BS, a terminal information request message including a second indicator to report the connection failure information, and in case that the second indicator is set to true, transmit, to the BS, a terminal information response message including connection failure report information including the count number about the connection failure.

The at least one processor may be further configured to, after confirming that the terminal information response message is transmitted, discard the connection failure report information included in the information container.

The at least one processor may be further configured to select a PLMN from one or more PLMNs included in a PLMN identity list in system information, and store a second PLMN identity corresponding to the selected PLMN in the information container.

The at least one processor may be further configured to determine whether a second PLMN identity of the registered PLMN is included in the information container, and in case that the second PLMN identity of the registered PLMN is not included in the information container, select a PLMN from one or more PLMNs included in a PLMN identity list in system information and store the second PLMN identity corresponding to the selected PLMN in the information container.

The at least one processor may be further configured to store a second PLMN identity corresponding to the registered PLMN in the information container without PLMN selection in an inactive mode.

The information container may include VarConnEstFailReport.

In accordance with another aspect of the disclosure, a method, performed by a terminal, for transmitting a signal in wireless communication system is provided. The method includes starting a timer when a Radio Resource Control (RRC) connection establishment procedure or an RRC connection resume procedure is initiated, identifying that the timer is expired or that, while the timer is running, an integrity check failure indication is received from a lower layer, determining whether at least one of a first condition or a second condition is met, the first condition including a condition that the terminal has connection failure information available in an information container and a registered Public Land Mobile Network (PLMN) does not correspond to a PLMN identity included in the information container, and the second condition including a condition that a first cell identity of a current cell is not equal to a second cell identity stored in measurement result information about a cell where connection failure happened, in response to determining that at least one of the first condition or the second condition is met, setting a count number about connection failure included in the information container is 0, and after determining whether at least one of the first condition or the second condition is met, clearing contents included in the information container except for the count number about the connection failure.

The information container may include connection failure report information and the PLMN identity, and the connection failure report information may include the count number about the connection failure and the measurement result information about the cell where the connection failure happened.

The PLMN identity and the measurement result information about the cell where the connection failure happened may be stored in the information container in response to the RRC connection establishment procedure or the RRC connection resume procedure failing.

The measurement result information about the cell where the connection failure happened may include at least one of a global cell identity, a tracking area code, reference signal received power (RSRP), or reference signal received quality (RSRQ).

The connection failure information may include at least one of connection establishment failure information or connection resume failure information.

The method may further include transmitting, to a base station (BS), an RRC setup request message in an idle mode or an RRC resume request message in an inactive mode, receiving, from the BS, an RRC setup message, entering a connected mode, identifying that the terminal has the connection failure information available in the information container and the registered PLMN corresponds to the PLMN identity included in the information container, transmitting, to the BS, an RRC setup complete message including a first indicator indicating that the terminal has available connection failure information, receiving, from the BS, a terminal information request message including a second indicator to report the connection failure information, and in case that the second indicator is set to true, transmitting, to the BS, a terminal information response message including connection failure report information including the count number about the connection failure.

The method may further include, after confirming that the terminal information response message is transmitted, discarding the connection failure report information included in the information container.

The method may further include selecting a PLMN from one or more PLMNs included in a PLMN identity list in system information, and storing a second PLMN identity corresponding to the selected PLMN in the information container.

The method may further include determining whether a second PLMN identity of the registered PLMN is included in the information container, and in case that the second PLMN identity of the registered PLMN is not included in the information container, selecting a PLMN from one or more PLMNs included in a PLMN identity list in system information and storing the second PLMN identity corresponding to the selected PLMN in the information container.

The method may further include storing a second PLMN identity corresponding to the registered PLMN (RPLMN) in the information container without PLMN selection in an inactive mode.

The information container may include VarConnEstFailReport.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1H is a flowchart of a procedure in which a terminal (e.g. UE) collects RRC connection establishment failure information and reports the same to an NR base station in an NR system, according to an embodiment of the disclosure;

FIG. 1I is a flowchart of a procedure in which a terminal (e.g. UE) collects RRC connection resume failure information and reports the same to an NR base station in an NR system, according to an embodiment of the disclosure;

Throughout the drawings, it should be noted that like reference numbers are used to depict the same or similar elements, features, and structures.

DETAILED DESCRIPTION

Figure 1A:
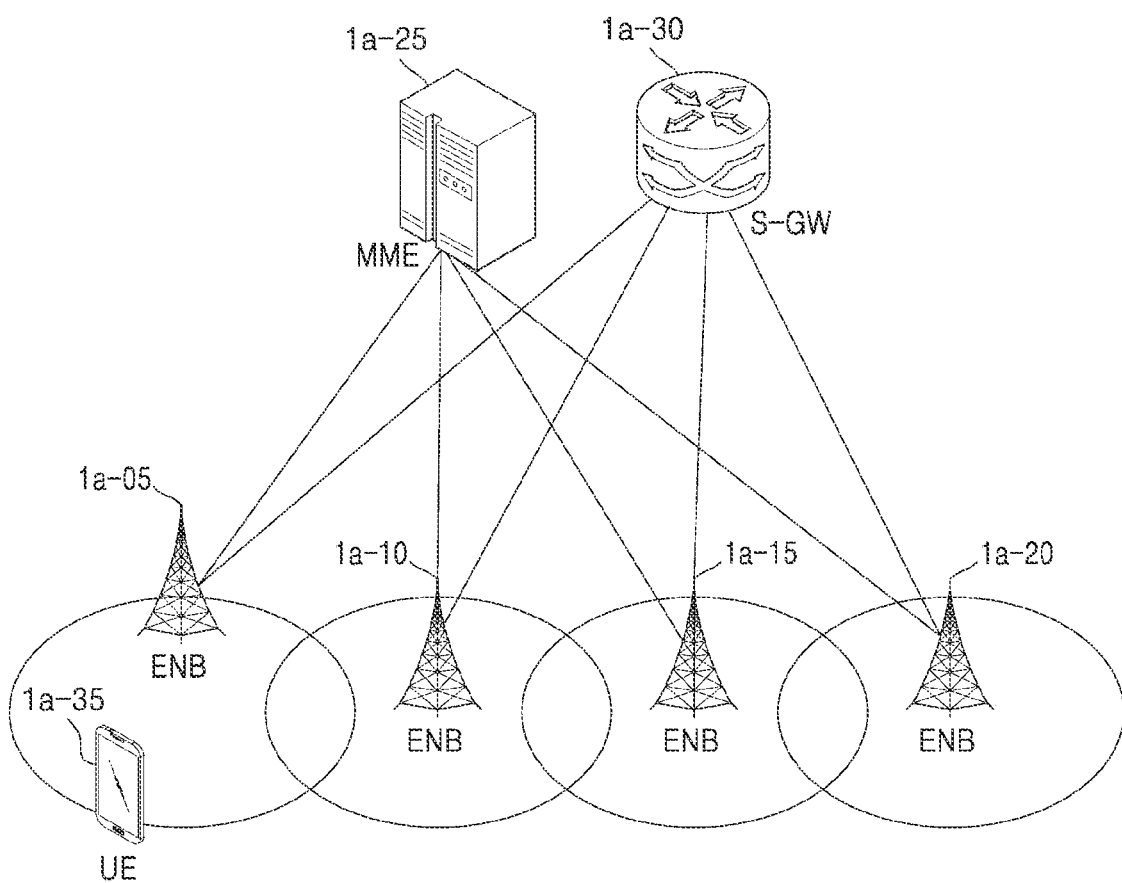
FIG. 1A is a diagram illustrating a structure of a long term evolution (LTE) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Advantages and features of the disclosure and a method for achieving them will be clear with reference to the accompanying drawings, in which embodiments are shown. However, the disclosure may be embodied in many different forms and should not be construed as being limited to the embodiments set forth below. Rather, the embodiments are provided so that the disclosure will be thorough and complete and will fully convey the concept of the disclosure to those of ordinary skill in the art to which the disclosure pertains, and the disclosure will only be defined by the appended claims. Like reference numerals denote like elements throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer-executable or computer readable memory capable of directing a computer or other programmable data processing equipment to implement the functions in a particular manner so that the instructions stored in the computer-executable or computer readable memory are also capable of producing manufacturing items containing instruction means for performing the functions described in the flowchart block(s). Computer program instructions may also be installed on a computer or other programmable data processing equipment so that a series of operations may be performed on a computer or other programmable data processing equipment to create a computer-executable process. Therefore, it is also possible for the instructions to operate the computer or other programmable data processing equipment to provide operations for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks illustrated in succession may be executed substantially simultaneously, or the blocks may sometimes be executed in reverse order depending on functions corresponding thereto.

In this case, the term "unit" used in embodiments set forth herein refers to a software element or a hardware element, such as a field programmable gate array (FPGA) or an application-specific integrated circuit (ASIC), which performs certain functions. However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes elements such as software elements, object-oriented software elements, class elements, and task elements, processes, functions, attributes, procedures, sub-routines, segments of program codes, drivers, firmware, microcodes, circuits, data, databases, data structures, tables, arrays, and variables. Functions provided in the elements and "portions", "modules" or "units" may be combined into a smaller number of elements and "portions", "modules" and "units", or sub-divided into additional elements and "portions", "modules" or "units". Also, the elements and "portions", "modules" or "units" may be configured to run on one or more central processing units (CPUs) in a device or a security multimedia card. In an embodiment of the disclosure, the "portion", "module", or "unit" may include one or more processors.

In the following description of the disclosure, when it is determined that detailed descriptions of related known functions or configurations may unnecessarily obscure the subject matter of the disclosure, the descriptions thereof will be omitted.

Also, terms for identifying access nodes, terms denoting network entities, terms denoting messages, terms denoting interfaces between network entities, terms denoting various types of identification information, etc. used herein are exemplified for convenience of description. Accordingly, the disclosure is not limited to the terms as herein used, and may use different terms to refer to objects having the same meaning in a technological sense.

For convenience of description, the terms and names defined in the $3^{rd}$ generation partnership project long term evolution (3GPP LTE) standard are used herein. However, the disclosure is not limited by such terms and names, and may be equally applied to systems conforming to other standards. In the disclosure, an evolved Node B (eNB) will be used interchangeably with a next-generation Node B (gNB) for convenience of description. For example, a base station described as an eNB may represent a gNB.

Future communication systems after LTE, that is, 5G communication systems have to be able to freely reflect various requirements of users and service providers. Therefore, services that satisfy various requirements at the same time have to be supported. Services considered for 5G communication systems include enhanced mobile broadband (eMBB), massive machine type communication (mMTC), and ultra reliability low latency communication (URLLC).

According to an embodiment of the disclosure, eMBB aims to provide a higher data rate than that supported by LTE, LTE-advanced (LTE-A) or LTE-Pro. For example, in 5G communication systems, eMBB has to be able to provide a peak data rate of 20 gigabits per second (Gbps) in a downlink and a peak data rate of 10 Gbps in an uplink in terms of a single base station. Also, the 5G communication systems have to provide a peak data rate and simultaneously provide an increased user perceived data rate of the UE. In order to satisfy such requirements, there is a need to improve various transmission and reception technologies including an improved multi-input multi-output (MIMO) transmission technology. In addition, signals are transmitted by using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, mMTC is under consideration so as to support application services such as Internet of Thing (IoT) in 5G communication systems. In order to efficiently provide IoT, mMTC needs to support access of a massive UE in a cell, improve coverage of the UE, improve battery time, and reduce costs of the UE. Because IoT is attached to various sensors and various devices to provide a communication function, IoT has to be able to support a large number of UEs (e.g., 1,000,000 UEs/km$^2$) in a cell. Also, due to the nature of the service, a UE supporting mMTC is likely to be located in a shaded area that is not covered by the cell, such as the basement of a building. Therefore, wider coverage than other services provided by the 5G communication systems may be required. The UE supporting mMTC has to be configured as an inexpensive UE, and it is difficult to frequently replace a battery of the UE. Therefore, a very long battery life time such as 10 to 15 years may be required.

Finally, URLLC is a cellular-based wireless communication service used for a specific purpose (mission-critical). URLLC may be used for services used in remote control for robots or machinery, industrial automation, unmanned aerial vehicles, remote health care, emergency alerts, or the like. Therefore, communication provided by URLLC has to provide very low latency and very high reliability. For example, a service supporting URLLC may have to satisfy air interface latency of less than 0.5 milliseconds and simultaneously may require a packet error rate equal to or less than $10^{-5}$. Therefore, for the service supporting URLLC, the 5G systems have to provide a smaller transmit time interval (TTI) than other services and simultaneously require a design matter that has to allocate a wide resource in a frequency band so as to ensure reliability of a communication link.

The aforementioned three services considered in 5G communication systems, that is, eMBB, URLLC, and mMTC, may be multiplexed and transmitted in a single system. In this case, different transmission and reception technologies and transmission and reception parameters may be used between services so as to satisfy different requirements of the respective services. However, mMTC, URLLC, and eMBB are only examples of different service types, and the service types to which the disclosure is applied are not limited to the aforementioned examples.

Also, although embodiments of the disclosure will be described below by using an LTE, LTE-A, LTE Pro, or 5G (or new radio (NR) as next-generation mobile communication) as an example, the embodiments of the disclosure may also be applied to other communication systems having similar technical backgrounds or channel forms. Also, embodiments of the disclosure may also be applied to other communication systems through some modifications without materially departing from the scope of the disclosure by the judgment of those of ordinary skill in the art.

Hereinafter, embodiments of the disclosure will be described with reference to accompanying drawings.

FIG. 1A is a diagram illustrating a structure of an LTE system, according to an embodiment of the disclosure.

Referring to FIG. 1A, a radio access network of the LTE system may include evolved Node Bs (hereinafter, also referred to as the eNBs, Node Bs, or base stations) 1a-05, 1a-10, 1a-15, and 1a-20, a mobility management entity (MME) 1a-25, and a serving gateway (S-GW) 1a-30. A UE (or terminal) 1a-35 may access an external network through the eNBs 1a-05 to 1a-20 and the S-GW 1a-30.

Referring to FIG. 1A, the eNBs 1a-05 to 1a-20 may correspond to an existing Node B of a universal mobile telecommunications service (UMTS) system. The eNB 1a-05, 1a-10, 1a-15, or 1a-20 may be connected to the UE 1a-35 on a radio channel and may perform complex functions compared to the existing Node B. In the LTE system, all user traffic including real-time services such as voice over Internet protocol (VoIP) based on an Internet protocol may be provided on a shared channel. Thus, an entity for collecting state information such as buffer states of UEs, available transmission power states, and channel states and performing scheduling is required, and such operations may be performed by the eNBs 1a-05 to 1a-20. A single eNB 1a-05, 1a-10, 1a-15, or 1a-20 may generally control a plurality of cells. For example, the LTE system may use radio access technology such as orthogonal frequency division multiplexing (OFDM) at a bandwidth of 20 MHz to achieve a data rate of 100 Mbps. In addition, an adaptive modulation and coding (AMC) scheme may be applied to determine a modulation scheme and a channel coding rate according to a channel state of a UE. The S-GW 1a-30 is an entity that provides data bearers, and may configure or release data bearers under the control by the MME 1a-25. The MME 1a-25 is an entity that performs various control functions as well as UE mobility management, and is connected to a plurality of eNBs.

Figure 1B:
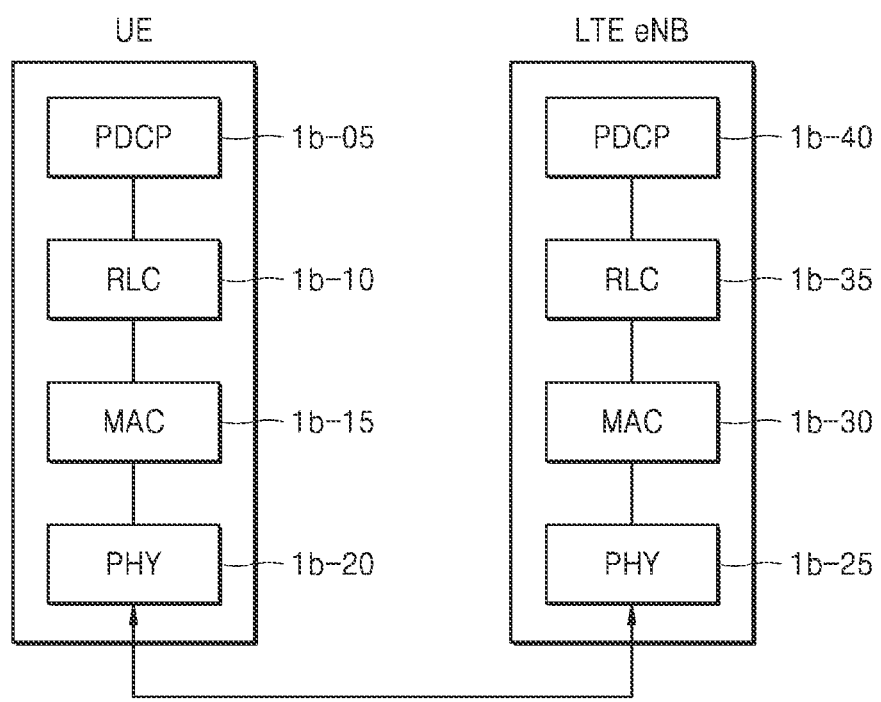
FIG. 1B is a diagram illustrating a radio protocol architecture of an LTE system, according to an embodiment of the disclosure.

FIG. 1B is a diagram illustrating a radio protocol architecture of an LTE system, according to an embodiment of the disclosure.

Referring to FIG. 1B, the radio protocol architecture of the LTE system includes packet data convergence protocol (PDCP) layers 1b-05 and 1b-40, radio link control (RLC) layers 1b-10 and 1b-35, and medium access control (MAC) layers 1b-15 and 1b-30 of a UE and an eNB. The PDCP layer 1b-05 or 1b-40 may perform operations such as IP header compression/reconstruction. Main functions of the PDCP layer 1b-05 or 1b-40 may be summarized as follows:

Header compression and decompression: Robust header compression (ROHC) only
Transfer of user data
In-sequence delivery of upper layer packet data units (PDUs) at PDCP re-establishment procedure for RLC acknowledged mode (AM)
For split bearers in dual connectivity (DC) (only support for RLC AM): PDCP PDU routing for transmission and PDCP PDU reordering for reception)
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 may perform an automatic repeat request (ARQ) operation or the like by reconfiguring PDCP PDUs to appropriate sizes. Main functions of the RLC layer 1b-10 or 1b-35 may be summarized as follows:

Transfer of upper layer PDUs
Error Correction through ARQ (only for AM data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 is connected to a plurality of RLC layers configured for one UE, and may multiplex RLC PDUs into a MAC PDU and demultiplex RLC PDUs from the MAC PDU. Main functions of the MAC layer 1b-15 or 1b-30 may be summarized as follows:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
Multimedia broadcast and multimedia service (MBMS) service identification
Transport format selection
Padding A physical (PHY) layer 1b-20 or 1b-25 may perform an operation of channel-coding and modulating upper layer data, making the channel-coded and modulated upper layer data into OFDM symbols, and transmitting the OFDM symbols over a radio channel, or demodulating OFDM symbols received through a radio channel, channel-decoding the demodulated OFDM symbols, and transmitting the decoded OFDM symbols to the upper layer.

Figure 1C:
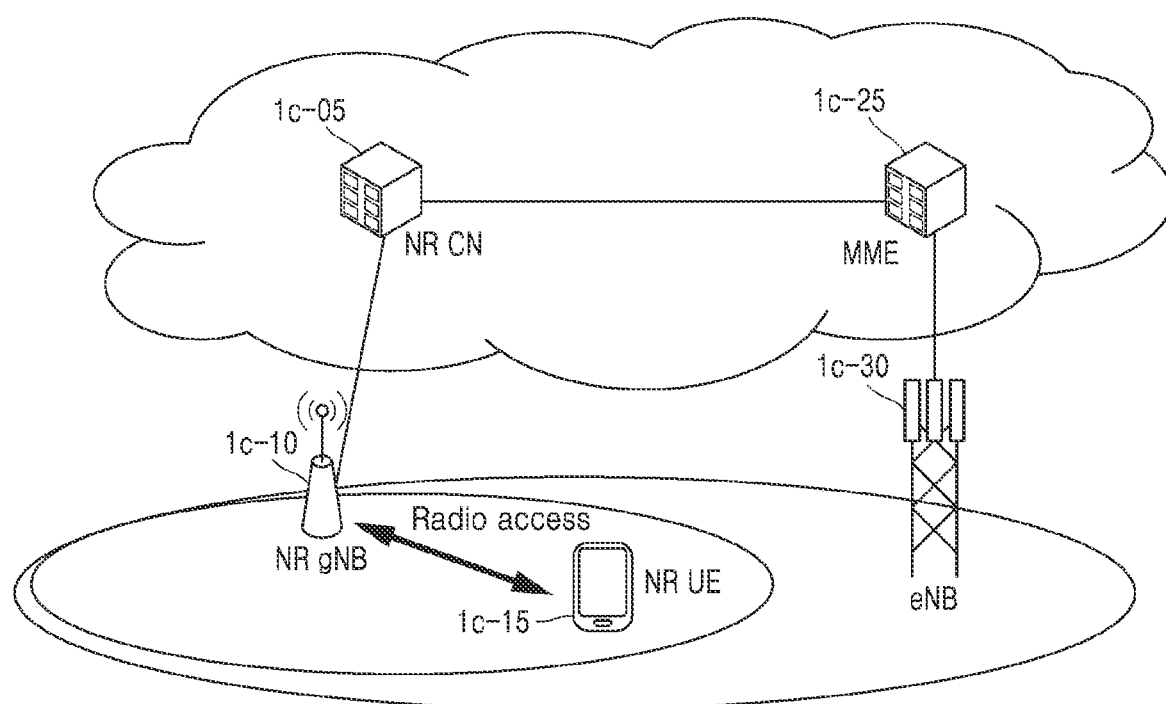
FIG. 1C is a diagram illustrating a structure of a next-generation mobile communication system, according to an embodiment of the disclosure.

FIG. 1C is a diagram illustrating a structure of a next-generation mobile communication system, according to an embodiment of the disclosure.

Referring to FIG. 1C, a radio access network of the next-generation mobile communication system (hereinafter, NR or 5G) may include an NR Node B 1c-10 (hereinafter, the NR gNB or NR base station) and an NR core network (CN) 1c-05. An NR UE 1c-15 (or a terminal) may access an external network through the NR gNB 1c-10 and the NR CN 1c-05.

Referring to FIG. 1C, the NR gNB 1c-10 may correspond to an eNB of an existing LTE system. The NR gNB 1c-10 is connected to the NR UE 1c-15 on a radio channel and may provide superior services than an existing Node B. In the next-generation mobile communication system, because all user traffic is serviced through a shared channel, an entity that collects state information such as buffer states of UEs, available transmission power states, and channel states and performs scheduling is required, and such operations may be performed by the NR gNB 1c-10. A single NR gNB 1c-10 may generally control a plurality of cells. To implement ultra-high data transmission compared to current LTE systems, the NR or 5G system may use an existing maximum bandwidth or greater, use OFDM as radio access technology, or combine the OFDM with beamforming technology. Also, an AMC scheme may be applied to determine a modulation scheme and a channel coding rate in accordance with a channel state of a UE. The NR CN 1c-05 performs functions such as mobility support, bearer configuration, quality of service (QoS) configuration, or the like. The NR CN 1c-05 is an entity that performs various control functions as well as UE mobility management, and is connected to a plurality of gNBs. Also, the next-generation mobile communication system may interoperate with the existing LTE system, and the NR CN 1c-05 may be connected to an MME 1c-25 through a network interface. The MME 1c-25 may be connected to an eNB 1c-30 which is an existing base station.

Figure 1D:
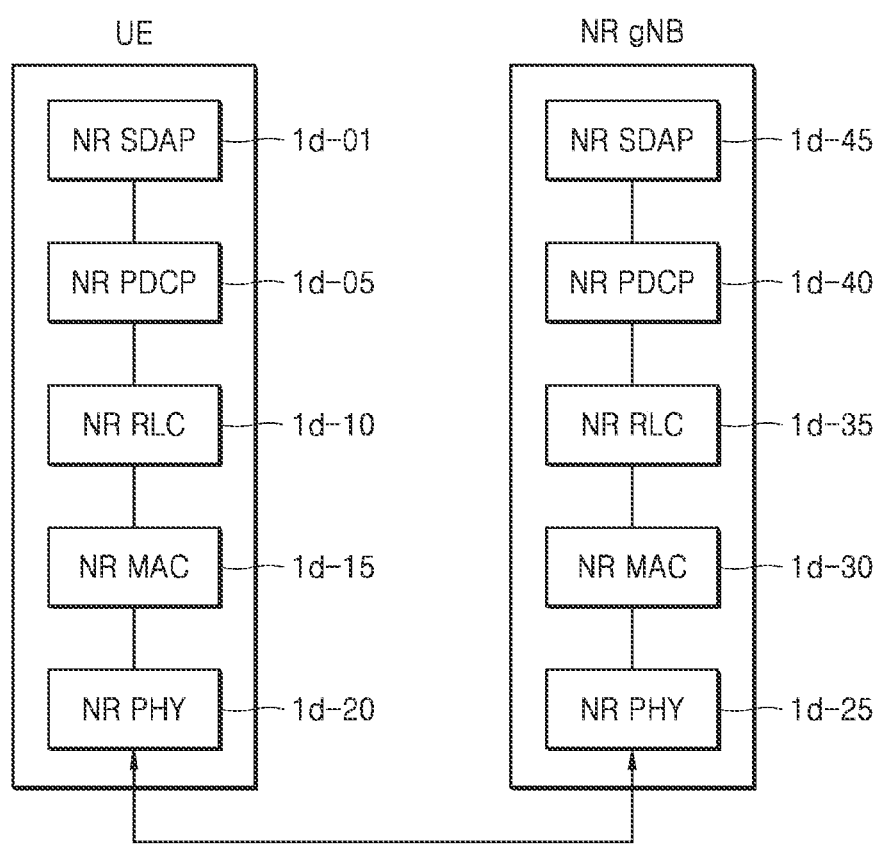
FIG. 1D is a diagram illustrating a radio protocol architecture of a next-generation mobile communication system, according to an embodiment of the disclosure.

FIG. 1D is a diagram illustrating a radio protocol architecture of a next-generation mobile communication system, according to an embodiment of the disclosure.

FIG. 1D is a diagram illustrating a radio protocol of a next-generation mobile communication system to which the disclosure is applicable.

Referring to FIG. 1D, the radio protocol architecture of the next-generation mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30.

Main functions of the NR SDAP layer 1d-01 or 1d-45 may include some of the following functions:
  Transfer of user plane data
  Mapping between a QoS flow and a DRB for both downlink (DL) and uplink (UL)
  Marking QoS flow ID in both DL and UL packets
  Reflective QoS flow to DRB mapping for the UL SDAP PDUs With regard to a SDAP layer, the UE may be configured whether to use a header of the SDAP layer or to use functions of the SDAP layer, through an RRC message per PDCP layer, per bearer, or per logical channel. When the SDAP header is configured, a 1-bit non-access stratum (NAS) reflective QoS configuration indicator and a 1-bit access stratum (AS) reflective QoS configuration indicator of the SDAP header may indicate the UE to update or reconfigure mapping information between a QoS flow and a data bearer for both UL and DL. The SDAP header may include QoS flow ID indicating QoS. QoS information may be used as data processing priority information, scheduling information, or the like for supporting a smooth service.

Main functions of the NR PDCP layer 1d-05 or 1d-40 may include some of the following functions:
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink The reordering of the NR PDCP layer 1d-05 and 1d-40 refers to a function of reordering PDCP PDUs received from a lower layer in order based on a PDCP sequence number (SN), and may include a function of delivering data to an upper layer in the reordering order or a function of immediately delivering the data to the upper layer without considering an order, a function of recording missing PDCP PDUs by reordering the PDCP PDUs, a function of reporting a state of the missing PDCP PDUs to a transmitting side, and a function of requesting retransmission of the missing PDCP PDUs.

Main functions of the NR RLC layer 1d-10 or 1d-35 may include at least some of the following functions:
  Transfer of upper layer PDUs
  In-sequence delivery of upper layer PDUs
  Out-of-sequence delivery of upper layer PDUs
  Error correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery of the NR RLC layer 1d-10 or 1d-35 may include a function of delivering RLC SDUs received from a lower layer, to an upper layer in order. Also, the in-sequence delivery of the NR RLC layer 1d-10 or 1d-35 may include a function of reassembling and delivering RLC SDUs, when a single RLC SDU is segmented into a plurality of RLC SDUs and received, and a function of reordering received RLC PDUs on an RLC SN or PDCP SN basis. Further, the in-sequence delivery of the NR RLC layer 1d-10 or 1d-35 may include a function of recording missing RLC PDUs by reordering the RLC PDUs, and a function of reporting a state of the missing RLC PDUs to a transmitting side. The in-sequence delivery of the NR RLC layer 1d-10 or 1d-35 may include a function of requesting retransmission of the missing RLC PDUs, and a function of delivering only RLC SDUs previous to a missing RLC SDU, to the upper layer in order, when the missing RLC SDU exists. Alternatively, the in-sequence delivery of the NR RLC layer 1d-10 or 1d-35 may include a function of delivering all RLC SDUs received before a certain timer started, to the upper layer in order, when the certain timer expired despite of a missing RLC SDU, or a function of delivering all RLC SDUs currently received, to the upper layer in order, when the certain timer expired despite of a missing RLC SDU. The NR RLC layer 1d-10 or 1d-35 may process the RLC PDUs in order of reception regardless of an order of sequence numbers (out-of-sequence delivery) and deliver the same to the NR PDCP layer 1d-05 or 1d-40. When segments are received, the NR RLC layer 1d-10 or 1d-35 may receive segments to be received later or stored in a buffer, reassemble the segments into a whole RLC PDU, process the whole RLC PDU, and deliver the same to the NR PDCP layer 1d-05 or 1d-40. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery of the NR RLC layer 1d-10 or 1d-35 refers to a function of immediately delivering RLC SDUs received from a lower layer, to an upper layer out of an order, and may include a function of reassembling and delivering RLC SDUs, when a single RLC SDU is segmented into a plurality of RLC SDUs and received, and a function of storing RLC SNs or PDCP SNs of received RLC PDUs and recording missing RLC PDUs by aligning the received RLC PDUs in order.

The NR MAC layer 1d-15 or 1d-30 may be connected to a plurality of NR RLC layers 1d-10 or 1d-35 configured for one UE, and main functions of the NR MAC layer 1d-15 or 1d-30 may include at least some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1d-20 or 1d-25 may perform an operation of channel-coding and modulating upper layer data, making the channel-coded and modulated upper layer data into OFDM symbols, and transmitting the OFDM symbols over a radio channel, or demodulating OFDM symbols received on a radio channel, channel-decoding the demodulated OFDM symbols, and transmitting the decoded OFDM symbols to the upper layer.

Figure 1E:
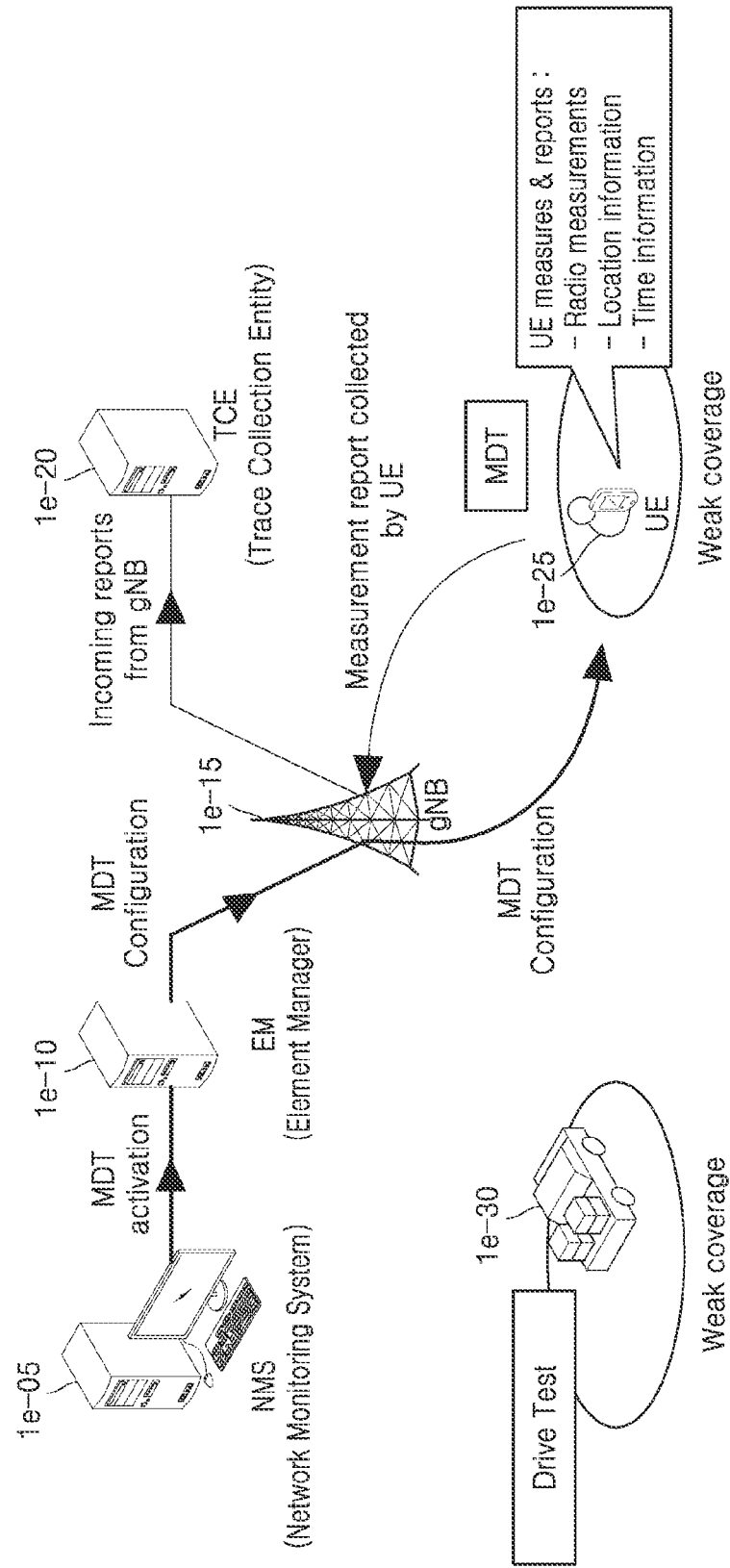
FIG. 1E is a diagram illustrating a method of collecting and reporting cell measurement information, according to an embodiment of the disclosure.

FIG. 1E is a diagram illustrating a method of collecting and reporting cell measurement information, according to an embodiment of the disclosure.

Referring to FIG. 1E, when a network is established or optimized, a mobile communication service provider (hereinafter, referred to the operator) generally measures the signal strength in an expected service area, and arranges or rearranges gNBs in the service area based on the measured signal strength. The operator loads signal measurement equipments into a vehicle 1e-30 and collects cell measurement information in the service area, and this process requires a lot of time and cost. The process of collecting the cell measurement information described above generally uses the vehicle 1e-30 and is thus referred to as a drive test. A UE 1e-25 is equipped with a function of measuring signals of a gNB 1e-15 to support operations such as cell reselection, handover, or addition of serving cells during movement between cells. Accordingly, a UE in the service area may be used in place of the drive test, and this is referred to as minimization of drive test (MDT). The operator may configure MDT operations for specific UEs through various constituent entities of the network, and the UEs in an RRC connection mode (RRC_CONNECTED), an RRC idle mode (RRC_IDLE), or an RRC inactive mode (RRC_INACTIVE) may collect and store signal strength information from a serving cell and neighboring cells. In addition, the UEs may store various pieces of information such as location information, time information, signal quality information, etc. The pieces of information that the UEs may store are not limited to the above example. The stored information may be reported to the network when the UEs are in the RRC connection mode, and the stored information may be delivered to a specific server.

The MDT operations may be largely classified as an Immediate MDT operation and a Logged MDT operation.

In the Immediate MDT operation, the UE immediately reports collected information to the network. The UE has to immediately report the collected information to the network, only a UE in the RRC connection mode may perform the Immediate operation. In general, radio resource management (RRM) measurement process for supporting operations such as handover and addition of serving cells is reused, and location information, time information, and the like may be additionally reported to the network.

In the Logged MDT operation, the UE stores collected information without immediately reporting the collected information to the network, and after the UE switches to the RRC connection mode, the UE reports the stored information. In general, a UE in the RRC idle mode or the RRC inactive mode in which immediately reporting collected information to the network is not possible may perform the Logged MDT operation. In the present specification, a UE in the RRC inactive mode introduced in the next-generation mobile communication system may perform the Logged MDT operation. When a specific UE is in the RRC connection mode, the network may provide the UE with configuration information for performing the Logged MDT operation, and the UE may switch to the RRC idle mode or the RRC inactive mode, and then collect and store the configuration information.

The following Table 1 is a table summarizing MDT modes (Immediate MDT and Logged MDT) that a UE may perform according to an RRC state of the UE.

TABLE 1

| | RRC state |
|---|---|
| Immediate MDT | RRC_CONNECTED |
| Logged MDT | RRC_IDLE, RRC_INACTIVE |

Figure 1F:
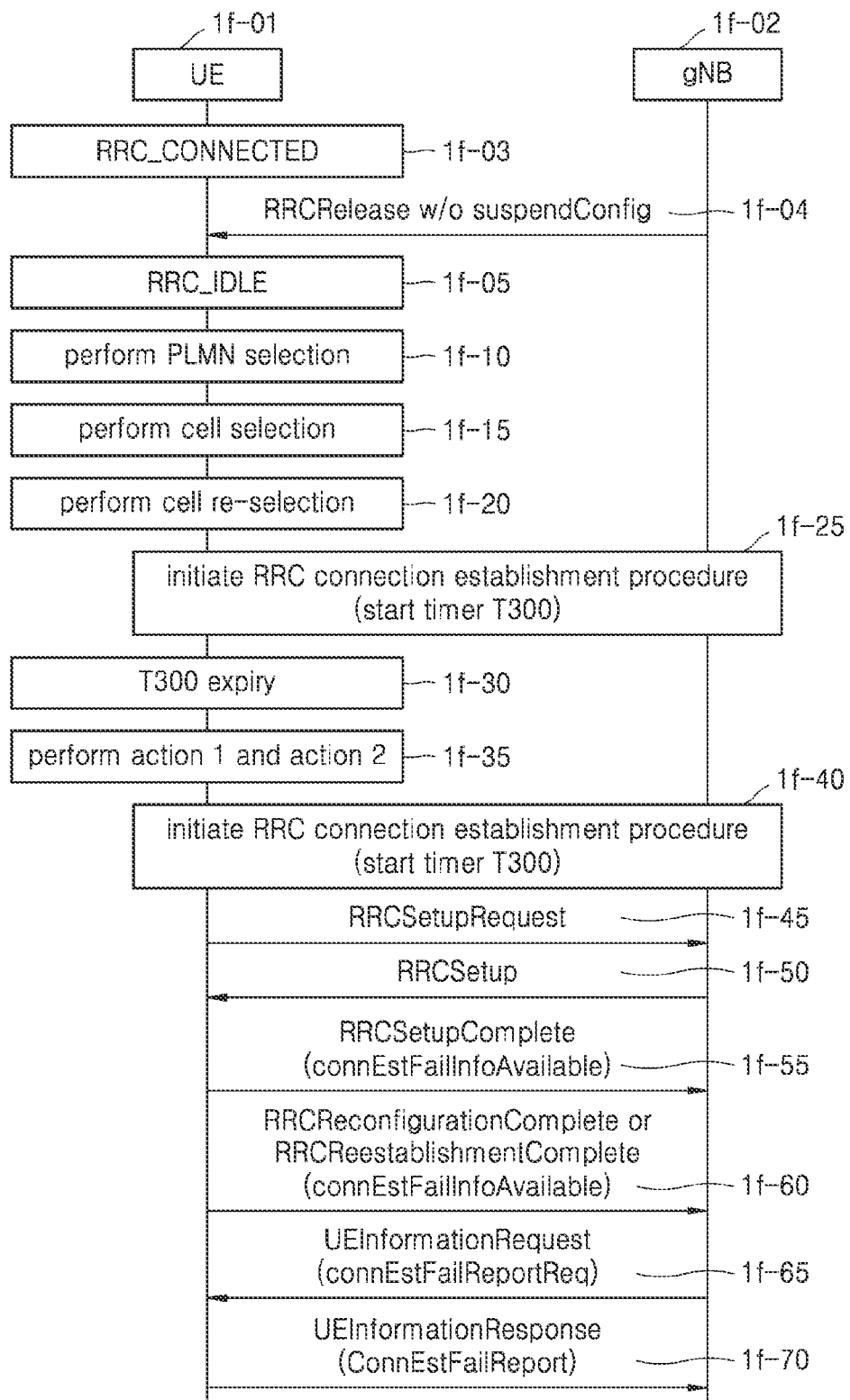
FIG. 1F is a flowchart of a procedure in which a terminal (e.g., user equipment (UE)) collects radio resource control (RRC) connection establishment failure information and reports the same to a new radio (NR) base station in an NR system, according to an embodiment of the disclosure.

FIG. IF is a flowchart of a procedure in which a UE 1f-01 collects radio resource control (RRC) connection establishment failure information and reports the same to an NR gNB 1f-02 in an NR system, according to an embodiment of the disclosure. Referring to FIG. 1F, in operation 1f-03, the UE 1f-01 may establish an RRC connection with the NR gNB 1f-02 and thus be in an RRC connection mode (RRC_CONNECTED).

In operation 1f-04, the NR gNB 1f-02 may transmit an RRCRelease message which does not include suspend configuration information (suspendConfig) to the UE 1f-01.

In operation 1f-05, the UE 1f-01 that received the RRCRelease message which does not include the suspend configuration information (suspendConfig) may transition to an RRC idle mode (RRC_IDLE).

In 1f-10, the UE 1f-01 in the RRC idle mode may perform a public land mobile network (PLMN) selection procedure. An access stratum (AS) layer of the UE 1f-01 may report at least one available PLMN to a non-access stratum (NAS) layer due to a request from the NAS layer or autonomously (In the UE, the AS shall report available PLMNs to the NAS on request from the NAS or automatically). In detail, the UE 1*f*-01 may scan all RF channels in NR bands according to its capability to find available PLMNs (The UE shall scan all RF channels in the NR bands according to its capabilities to find available PLMNs). For each carrier, the UE 1*f*-01 may find a cell having strongest signal strength and read system information from the cell, and this is to find at least one PLMN to which the cell belongs (On each carrier, the UE shall search for the strongest cell and read its system information, in order to find out which of one or more PLMNs the cell belongs to). When the UE 1*f*-01 is able to read at least one PLMN identity in the cell having the strongest signal strength, the UE 1*f*-01 may report to the NAS layer that each found PLMN is a high-quality PLMN, provided that the following high-quality condition is fulfilled (If the UE can read one or several PLMN identities in the strongest cell, each found PLMN shall be reported to the NAS as a high quality PLMN (but without the RSRP value), provided that the following high-quality criterion is fulfilled).

High-quality condition: For an NR cell, a measured reference signal received power (RSRP) value is greater than or equal to −110 dBm (For an NR cell, the measured RSRP value shall be greater than or equal to −110 dBm)

When the found PLMNs do not fulfill the above high-quality condition but the UE 1*f*-01 is able to read PLMN identities, the UE 1*f*-01 may report RSRP measured values and the PLMN identities to the NAS layer (Found PLMNs that do not satisfy the high-quality criterion but for which the UE has been able to read the PLMN identities are reported to the NAS together with their corresponding RSRP values). Each measured value reported by the UE 1*f*-01 to the NAS layer may be a value for each PLMN found in each cell (The quality measure reported by the UE to NAS shall be the same for each PLMN found in one cell).

A PLMN selection procedure may not be performed in response to a request from the NAS layer (The search for PLMNs may be stopped on request from the NAS). The UE 1*f*-01 may optimize the PLMN selection procedure by using stored information (e.g., information about frequencies and cell parameters optionally obtainable from previously received measurement control information elements).

In operation 1*f*-15, when the UE 1*f*-01 in the RRC idle mode selects a PLMN, the UE 1*f*-01 may perform a cell selection procedure to select a suitable cell of the PLMN so as to camp on the suitable cell (Once the UE has selected a PLMN, the cell selection procedure shall be performed in order to select a suitable cell of that PLMN to camp on).

In operation 1*f*-20, the UE 1*f*-01 in the RRC idle mode may perform a cell reselection procedure to find a more suitable cell.

In operation 1*f*-25, the UE 1*f*-01 in the RRC idle mode may initiate an RRC connection establishment procedure with the NR gNB 1*f*-02. Upon initiation of the RRC connection establishment procedure, the UE 1*f*-01 may start a timer T300 (Upon initiation of the procedure, UE starts timer T300). Upon reception of an RRCSetup or RRCReject message from the NR gNB 1*f*-02, cell reselection, or suspension of the RRC connection establishment procedure by an upper layer (upon reception of RRCSetup or RRCReject message, cell re-selection and upon abortion of connection establishment by upper layers), the UE 1*f*-01 may stop the running timer T300.

In operation 1*f*-30, the timer T300 that is started by the UE 1*f*-01 in operation 1*f*-25 may expire.

When the timer T300 expires, in operation 1*f*-35, the UE 1*f*-01 may perform the following action 1 and action 2 in order.

According to an embodiment of the disclosure, action 1 may be a first operation for processing a connection failure. For example, the first operation for processing the connection failure may not be related to reporting of the connection failure. However, embodiments of the disclosure are not limited to the above example. Also, the first operation may not be related to VarConnEstFailReport.

The first operation for processing the connection failure may include at least one of the following operations. Also, a plurality of operations among the following operations may be performed sequentially or continuously regardless of an order.

reset a MAC layer, release a configuration of the MAC layer, and re-establish an RLC layer for all radio bearers (RBs) that are established (reset MAC, release the MAC configuration and re-establish RLC for all RBs that are established)

when the timer T300 expired a consecutive connEstFailCount time on the same cell as a cell for which connEstFailureControl is included in system information block 1 (SIB1), for a period indicated by connEstFailOffsetValidity, use connEstFailOffset for a parameter Qoffsettemp for a concerned cell when cell selection and reselection are performed (if the T300 has expired a consecutive connEstFailCount times on the same cell for which connEstFailureControl is included in SIB1, for a period as indicated by connEstFailOffsetValidity, use connEstFailOffset for the parameter Qoffsettemp for the concerned cell when performing cell selection and reselection according to TS 38.304 and TS 36.304)

According to an embodiment of the disclosure, action 2 may be a second operation for processing a connection failure. For example, the second operation for processing the connection failure may be related to reporting of the connection failure. However, embodiments of the disclosure are not limited to the above example. Also, the second operation may be related to VarConnEstFailReport.

The second operation for processing the connection failure may include at least one of the following operations. Also, a plurality of operations among the following operations may be performed sequentially or continuously regardless of an order.

discard content included in VarConnEstFailReport except for numberOfConnFail (clear the content included in VarConnEstFailReport except for the numberOfConnFail, if any)

when the UE has connection establishment failure information available in VarConnEstFailReport and a registered PLMN (RPLMN) is not identical to plmn-Identity stored in VarConnEstFailReport, reset numberOfConnFail to 0 (if the UE has connection establishment failure information available in VarConnEstFailReport and if the RPLMN is not equal to plmn-identity stored in VarConnEstFailReport, reset the numberOfConnFail to 0)

store connection establishment failure information in VarConnEstFailReport by configuring its fields as follows (store the following connection establishment failure information in the VarConnEstFailReport by setting its fields as follows):

1) configure plmn-Identity to a PLMN selected by upper layers (see TS 23.122 and TS 24.501) from among one or more PLMNs included in plmn-IdentityList in SIB1 (set the plmn-Identity to the PLMN selected by upper layers (see TS 23.122, TS 24.501) from the one or more PLMNs included in the plmn-IdentityList in SIB1)
2) configure measResultFailedCell to include a global cell ID, a tracking area code, a physical cell ID, RSRP, and reference signal received quality (RSRQ) of a failed cell, based on available SSB measurements collected up to a time point at which the UE detected a connection establishment failure (set the measResultFailedCell to include the global cell identity, tracking area code, physical cell id, the RSRP, and RSRQ, of the failed cell based on the available SSB measurements collected up to the moment the UE detected connection establishment failure)
3) if available, configure measResultNeighCells in descending order of ranking criterion used for cell reselection, to include neighboring cell measurements for at most the following number of neighboring cells (if available, set the measResultNeighCells, in order of decreasing ranking-criterion as used for cell re-selection, to include neighboring cell measurements for at most the following number of neighboring cells): 6 intra-frequency and 3 inter-frequency neighbors per frequency as well as 3 inter-RAT neighbors per frequency/set of frequencies per RAT, and according to the following: for each neighboring cell included, include optional fields that are available (6 intra-frequency and 3 inter-frequency neighbors per frequency as well as 3 inter-RAT neighbors, per frequency/set of frequencies per RAT and according to the following: for each neighbor cell included, include the optional fields that are available)
4) if available, configure locationInfo as follows (if available, set the locationInfo as follows):
    i) if available, configure commonLocationInfo to include detailed location information (if available, set the commonLocationInfo to include the detailed location information)
    ii) if available, configure bt-LocationInfo to include Bluetooth measurement results in descending order of received signal strength indicator (RSSI) for Bluetooth beacons (if available, set the bt-LocationInfo to include the Bluetooth measurement results, in order of decreasing RSSI for Bluetooth beacons)
    iii) if available, configure wlan-LocationInfo to include wireless local area network (WLAN) measurement results in descending order of RSSI for WLAN access points (APs) (if available, set the wlan-LocationInfo to include the WLAN measurement results, in order of decreasing RSSI for WLAN APs)
    iv) if available, configure sensor-LocationInfo to include sensor measurement results (if available, set the sensor-LocationInfo to include the sensor measurement results)
5) configure perRAInfoList to indicate random access failure information (set perRAInfoList to indicate random access failure information)
6) when the numberOfConnFail is smaller than 7, increase the numberOfConnFail by 1 (if the numberOfConnFail is smaller than 7, increment the numberOfConnFail by 1)

inform the upper layers of an RRC connection establishment failure (inform upper layers about the failure to establish the RRC connection, upon which the procedure ends)

When the UE 1*f*-01 according to the embodiment of the disclosure performs the above second operation in sequence, two problems may occur.

Problem 1: A value of the numberOfConnFail may always be reset to 0.

VarConnEstFailReport is composed of ConnEstFailReport and plmn-Identity, and when the discarding of content included in VarConnEstFailReport except for numberOfConnFail (clear the content included in VarConnEstFailReport except for the numberOfConnFail, if any) is performed first, the plmn-Identity stored in the VarConnEstFailReport is discarded.

Thus, because only the numberOfConnFail remains in the VarConnEstFailReport while the plmn-Identity is discarded, when the resetting of numberOfConnFail to 0 when the UE has connection establishment failure information available in VarConnEstFailReport and the RPLMN is not identical to plmn-Identity stored in the VarConnEstFailReport (if the UE has connection establishment failure information available in VarConnEstFailReport and if the RPLMN is not equal to plmn-identity stored in VarConnEstFailReport, reset the numberOfConnFail to 0) is performed, the UE may have inefficiency of always resetting the numberOfConnFail to 0.

Problem 2: In operation 1*f*-25, the UE 1*f*-01 may perform the RRC connection establishment procedure for reasons other than PLMN reselection (e.g., when a paging message is received from the NR gNB 1*f*-02), a PLMN may be unnecessarily selected, resulting in configuration of an identity of the selected PLMN in the VarConnEstFailReport. For example, when the UE 1*f*-01 successfully performs a NAS registration procedure in operation 1*f*-03, receives an RRC connection release message (RRCRelease) from the NR gNB 1*f*-02 in operation 1*f*-04, transitions to the RRC idle mode, and then performs the RRC connection establishment procedure in operation 1*f*-25 for reasons other than PLMN reselection, and performs operations 1*f*-30 and 1*f*-35, PLMN reselection may be unnecessarily performed, resulting in the following operation.

1) configure plmn-Identity to a PLMN selected by upper layers (see TS 23.122, TS 24.501) from among PLMNs included in plmn-IdentityList in SIB1 (set the plmn-Identity to the PLMN selected by upper layers (see TS 23.122, TS 24.501) from the one or more PLMNs included in the plmn-IdentityList in SIB1)

In operation 1*f*-40, the UE 1*f*-01 in the RRC idle mode may initiate the RRC connection establishment procedure with the NR gNB 1*f*-02. Upon initiation of the RRC connection establishment procedure, the UE 1*f*-01 may start a timer T300 (Upon initiation of the procedure, UE starts timer T300).

In operation 1*f*-45, the UE 1*f*-01 in the RRC idle mode may transmit an RRCSetupRequest message to the NR gNB 1*f*-02.

In operation 1*f*-50, the NR gNB 1*f*-02 may transmit an RRCSetup message to the UE 1*f*-01 in the RRC idle mode. The UE 1*f*-01 that received the RRCSetup message may transition to the RRC connection mode after applying information included in the RRCSetup message.

In operation **1*f*-55, when the connection establishment failure information is included in the VarConnEstFailReport and the plmn-Identity stored in the VarConnEstFailReport is identical to the RPLMN, the UE 1*f*-01 that transitioned to the RRC connection mode may transmit a connEstFailInfoAvailable indicator in an RRCSetupComplete message to the NR gNB 1*f*-02**.

In operation **1*f*-60, when the connection establishment failure information is included in the VarConnEstFailReport and the plmn-Identity stored in the VarConnEstFailReport is identical to the RPLMN, the UE 1*f*-01 in the RRC connection mode may transmit, to the NR gNB 1*f*-02**, a connEstFailInfoAvailable indicator in an RRCReconfigurationComplete message or an RRCRestablishmentComplete message.

In operation **1*f*-65, the NR gNB 1*f*-02 may transmit a UEInformationRequest message to the UE 1*f*-01** by configuring connEstFailReportReq to true in the UEInformationRequest message.

In operation **1*f*-70, when connEstFailReportReq is configured to true in the received UEInformationRequest message, the connection establishment failure information is included in the VarConnEstFailReport, and the plmn-Identity stored in the VarConnEstFailReport is identical to the RPLMN, the UE 1*f*-01 may transmit a UEInformationResponse message to the NR gNB 1*f*-02** by performing the following operations.

configure timeSinceFailure of VarConnEstFailReport to a time elapsed since a last connection establishment failure in NR (set timeSinceFailure in VarConnEstFailReport to the time that elapsed since the last connection establishment failure in NR)

configure connEstFailReport in UEInformationResponse message to a value of connEstFailReport in VarConnEstFailReport (set the connEstFailReport in the UEInformationResponse message to the value of connEstFailReport in VarConnEstFailReport)

When it is confirmed by a lower layer that the UEInformationResponse message is successfully transmitted, the UE **1*f*-01** may discard the connEstFailReport from the VarConnEstFailReport (discard the connEstFailReport from VarConnEstFailReport upon successful delivery of the UEInformationResponse message confirmed by lower layers).

Figure 1G:
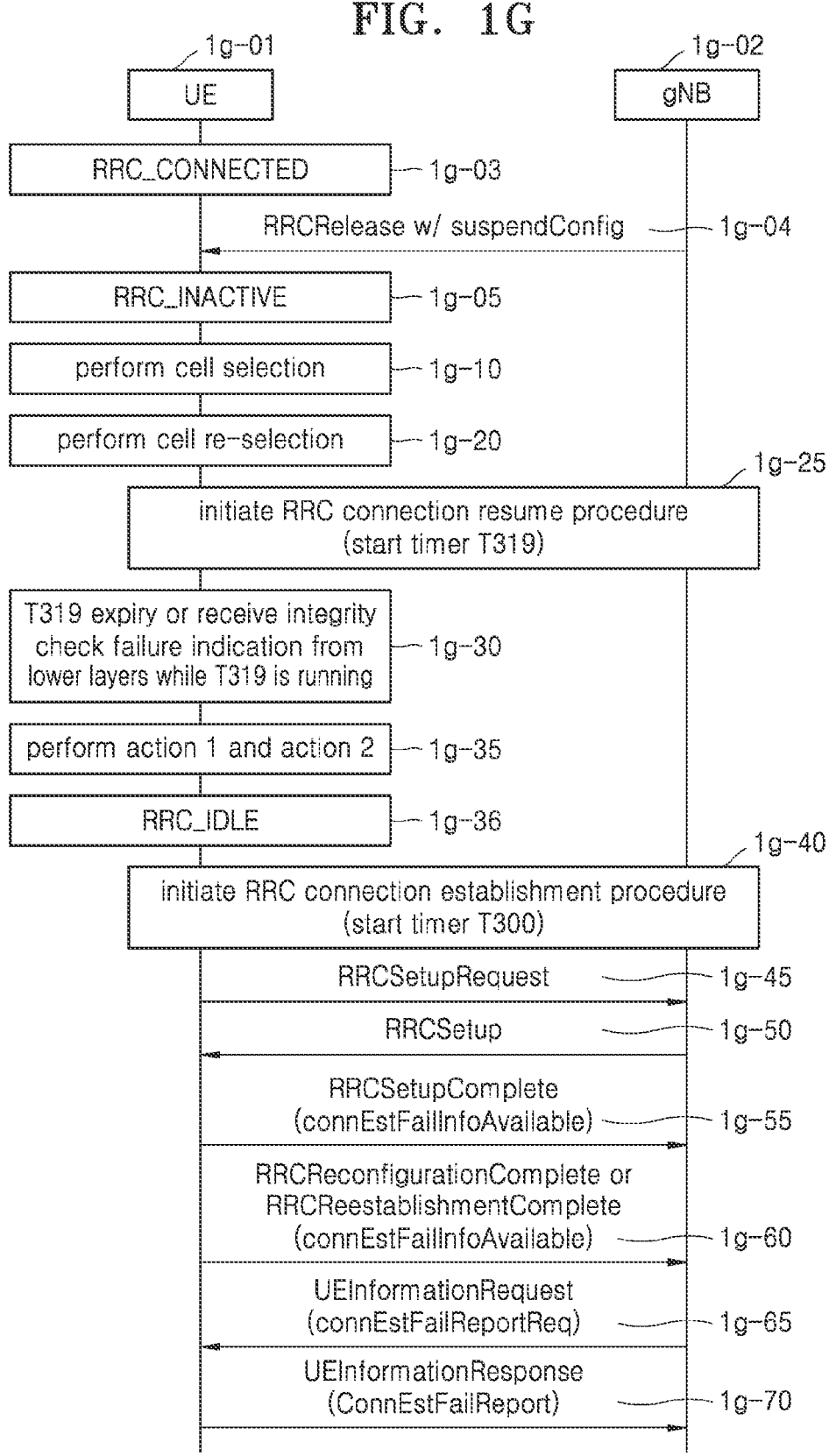
FIG. 1G is a flowchart of a procedure in which a terminal (e.g. UE) collects RRC connection resume failure information and reports the same to an NR base station in an NR system, according to an embodiment of the disclosure.

FIG. 1G is a flowchart of a procedure in which a terminal (e.g. UE **1*g*-01) collects RRC connection resume failure information and reports the same to an NR gNB 1*g*-02** in an NR system, according to an embodiment of the disclosure.

The RRC connection resume failure information according to the embodiment of the disclosure may be interpreted in the same meaning as the RRC connection establishment failure information.

Referring to FIG. 1G, in operation **1*g*-03, the UE 1*g*-01 may establish an RRC connection with the NR gNB 1*g*-02** and thus be in an RRC connection mode (RRC_CONNECTED).

In operation **1*g*-04, the NR gNB 1*g*-02 may transmit an RRCRelease message including suspend configuration information (suspendConfig) to the UE 1*g*-01**.

In operation **1*g*-05, the UE 1*g*-01** that received the RRCRelease message including the suspend configuration information (suspendConfig) may transition to an RRC inactive mode (RRC_INACTIVE).

In operation **1*g*-10, the UE 1*g*-01** in the RRC inactive mode may perform a cell selection procedure to select a suitable cell to be camped on.

In operation **1*g*-20, the UE 1*g*-01** in the RRC inactive mode may perform a cell reselection procedure to find a more suitable cell.

In operation **1*g*-25, the UE 1*g*-01 in the RRC inactive mode may initiate an RRC connection resume procedure with the NR gNB 1*g*-02. Upon initiation of the RRC connection resume procedure, the UE 1*g*-01 may start a timer T319 (Upon initiation of the procedure, UE starts timer T319). Upon reception of an RRCResume, RRCSetup, RRCRelease without suspendConfig, RRCRelease with suspendConfig, or RRCReject message from the NR gNB 1*g*-02, cell reselection, or suspension of the RRC connection establishment procedure by upper layers, the UE 1*g*-01** may stop the running timer T319.

In operation **1*g*-30, the timer T319 which is started in operation 1*g*-25 may expire or the UE 1*g*-01** may receive an integrity check failure indication from a lower layer while the timer T319 is running.

As soon as the running timer T319 expires or the integrity check failure indication is received from the lower layer while the timer T319 is running, in operation **1*g*-35, the UE 1*g*-01** may perform the following action 1 and action 2 in order.

According to an embodiment of the disclosure, action 1 may be a first operation for processing a connection failure. For example, the first operation for processing the connection failure may not be related to reporting of the connection failure. However, embodiments of the disclosure are not limited to the above example. Also, the first operation may not be related to VarConnEstFailReport.

The first operation for processing the connection failure may include at least one of the following operations. Also, a plurality of operations among the following operations may be performed sequentially or continuously regardless of an order.

discard content included in VarConnEstFailReport except for numberOfConnFail (clear the content included in VarConnEstFailReport except for the numberOfConnFail, if any)

when the UE has resume connection establishment failure information available in VarConnEstFailReport and the RPLMN is not identical to plmn-Identity stored in VarConnEstFailReport, reset numberOfConnFail to 0 (if the UE has connection resume failure information available in VarConnEstFailReport and if the RPLMN is not equal to plmn-identity stored in VarConnEstFailReport, reset the numberOfConnFail to 0)

store resume connection establishment failure information in VarConnEstFailReport by configuring its fields as follows (store the following resume connection establishment failure information in the VarConnEstFailReport by setting its fields as follows):

1) configure plmn-Identity to a PLMN selected by upper layers (see TS 23.122, TS 24.501) from among PLMNs included in plmn-IdentityList in SIB1 (set the plmn-Identity to the PLMN selected by upper layers (see TS 23.122, TS 24.501) from the one or more PLMNs included in the plmn-IdentityList in SIB1)

2) configure measResultFailedCell to include a global cell ID, a physical cell ID, RSRP, and RSRQ of a failed cell, based on available SSB measurements collected up to a time point at which the UE detected a connection establishment failure (set the measResultFailedCell to include the global cell identity, physical cell id, the RSRP, and RSRQ, of the failed cell based on the available SSB measurements collected up to the moment the UE detected connection establishment failure)
3) if available, configure measResultNeighCells in descending order of ranking criterion used for cell reselection, to include neighboring cell measurements for at most the following number of neighboring cells (if available, set the measResultNeighCells, in order of decreasing ranking-criterion as used for cell re-selection, to include neighboring cell measurements for at most the following number of neighboring cells): 6 intra-frequency and 3 inter-frequency neighbors per frequency as well as 3 inter-RAT neighbors per frequency/set of frequencies per RAT, and according to the following: for each neighboring cell included, include optional fields that are available (6 intra-frequency and 3 inter-frequency neighbors per frequency as well as 3 inter-RAT neighbors, per frequency/set of frequencies per RAT and according to the following: for each neighbor cell included, include the optional fields that are available)
4) if available, configure locationInfo as follows (if available, set the locationInfo as follows):
   i) if available, configure commonLocationInfo to include detailed location information (if available, set the commonLocationInfo to include the detailed location information)
   ii) if available, configure bt-LocationInfo to include Bluetooth measurement results in descending order of RSSI for Bluetooth beacons (if available, set the bt-LocationInfo to include the Bluetooth measurement results, in order of decreasing RSSI for Bluetooth beacons)
   iii) if available, configure wlan-LocationInfo to include WLAN measurement results in descending order of RSSI for WLAN APs (if available, set the wlan-LocationInfo to include the WLAN measurement results, in order of decreasing RSSI for WLAN APs)
   iv) if available, configure sensor-LocationInfo to include sensor measurement results (if available, set the sensor-LocationInfo to include the sensor measurement results)
5) configure perRAInfoList to indicate random access failure information (set perRAInfoList to indicate random access failure information)
6) when the numberOfConnFail is smaller than 7, increase the numberOfConnFail by 1 (if the numberOfConnFail is smaller than 7, increment the numberOfConnFail by 1)

According to an embodiment of the disclosure, action 2 may be a second operation for processing a connection failure. For example, the second operation for processing the connection failure may be related to reporting of the connection failure. However, embodiments of the disclosure are not limited to the above example. Also, the second operation may be related to VarConnEstFailReport.

The second operation for processing the connection failure may include at least one of the following operations. Also, a plurality of operations among the following operations may be performed sequentially or continuously regardless of an order.

perform an action to transition to an RRC_IDLE state specified in 3GPP TS 38.331 5.3.11 as a release cause of "RRC Resume failure" (perform the actions upon going to RRC_IDLE as specified in 3GPP TS 38.331 5.3.11 with release cause 'RRC Resume failure')

When the UE 1g-01 according to the embodiment of the disclosure performs action 1 in sequence, two problems may occur.

Problem 1: A value of the numberOfConnFail may always be reset to 0.

VarConnEstFailReport is composed of ConnEstFailReport and plmn-Identity, and when the discarding of content included in VarConnEstFailReport except for numberOfConnFail (clear the content included in VarConnEstFailReport except for the numberOfConnFail, if any) is performed first, the plmn-Identity stored in the VarConnEstFailReport is discarded.

Thus, because only the numberOfConnFail remains in the VarConnEstFailReport and the plmn-Identity is discarded, when the resetting of numberOfConnFail to 0 when the UE has connection establishment failure information available in VarConnEstFailReport and the RPLMN is not identical to plmn-Identity stored in the VarConnEstFailReport (if the UE has connection establishment failure information available in VarConnEstFailReport and if the RPLMN is not equal to plmn-Identity stored in VarConnEstFailReport, reset the numberOfConnFail to 0) is performed, the UE may always have inefficiency of resetting the numberOfConnFail to 0.

Problem 2: The UE 1g-01 in the RRC inactive mode may not perform a PLMN selection procedure. Accordingly, it may result in unnecessary PLMN reselection to perform the "set the plmn-Identity to the PLMN selected by upper layers (see TS 23.122, TS 24.501) from the one or more PLMNs included in the plmn-IdentityList in SIB1".

In operation 1g-36, the UE 1g-01 is in an RRC idle mode. In operation 1g-40, the UE 1g-01 in the RRC idle mode may initiate the RRC connection establishment procedure with the NR gNB 1g-02. Upon initiation of the RRC connection establishment procedure, the UE 1g-01 may start a timer T300 (Upon initiation of the procedure, UE starts timer T300).

In operation 1g-45, the UE 1g-01 in the RRC idle mode may transmit an RRCSetupRequest message to the NR gNB 1g-02.

In operation 1g-50, the NR gNB 1g-02 may transmit an RRCSetup message to the UE 1g-01 in the RRC idle mode. The UE 1g-01 that received the RRCSetup message may transition to the RRC connection mode after applying information included in the RRCSetup message.

In operation 1g-55, when the connection establishment failure information is included in the VarConnEstFailReport and the plmn-Identity stored in the VarConnEstFailReport is identical to the RPLMN, the UE 1g-01 that transitioned to the RRC connection mode may transmit a connEstFailInfoAvailable indicator in an RRCSetupComplete message to the NR gNB 1g-02.

In operation 1g-60, when the connection establishment failure information is included in the VarConnEstFailReport and the plmn-Identity stored in the VarConnEstFailReport is identical to the RPLMN, the UE 1g-01 in the RRC connection mode may transmit, to the NR gNB 1g-02, a connEstFailInfoAvailable indicator in an RRCReconfigurationComplete message or an RRCRestablishmentComplete message.

In operation 1g-65, the NR gNB 1g-02 may transmit a UEInformationRequest message to the UE 1g-01 by configuring connEstFailReportReq to true in the UEInformationRequest message.

In operation 1g-70, when connEstFailReportReq is configured to true in the received UEInformationRequest message, the connection establishment failure information is included in the VarConnEstFailReport, and the plmn-Identity stored in the VarConnEstFailReport is identical to the RPLMN, the UE 1g-01 may transmit a UEInformationResponse message to the NR gNB 1g-02 by performing the following operations.

> configure timeSinceFailure of VarConnEstFailReport to a time elapsed since a last connection establishment failure in NR (set timeSinceFailure in VarConnEstFailReport to the time that elapsed since the last connection establishment failure in NR)
> 
> configure connEstFailReport in UEInformationResponse message to a value of connEstFailReport in VarConnEstFailReport (set the connEstFailReport in the UEInformationResponse message to the value of connEstFailReport in VarConnEstFailReport)

When it is confirmed by a lower layer that the UEInformationResponse message is successfully transmitted, the UE 1g-01 may discard connEstFailReport from VarConnEstFailReport (discard the connEstFailReport from VarConnEstFailReport upon successful delivery of the UEInformationResponse message confirmed by lower layers).

FIG. 1H is a flowchart of a procedure in which a terminal (e.g. UE 1h-01) collects RRC connection establishment failure information and reports the same to an NR gNB 1h-02 in an NR system, proposed according to an embodiment of the disclosure.

Referring to FIG. 1H, in operation 1h-03, the UE 1h-01 may establish an RRC connection with the NR gNB 1h-02 and thus be in an RRC connection mode (RRC_CONNECTED).

In operation 1h-04, the NR gNB 1h-02 may transmit an RRCRelease message which does not include suspend configuration information (suspendConfig) to the UE 1h-01.

In operation 1h-05, the UE 1h-01 that received the RRCRelease message which does not include the suspend configuration information (suspendConfig) may transition to an RRC idle mode (RRC_IDLE).

In operation 1h-10, the UE 1h-01 in the RRC idle mode may perform a PLMN selection procedure. An AS layer of the UE 1h-01 may report at least one available PLMN to an NAS layer due to a request from the NAS layer or autonomously (In the UE, the AS shall report available PLMNs to the NAS on request from the NAS or automatically). In detail, the UE 1h-01 may scan all RF channels in NR bands according to its capability to find available PLMNs (The UE shall scan all RF channels in the NR bands according to its capabilities to find available PLMNs). For each carrier, the UE 1h-01 may find a cell having strongest signal strength and read system information from the cell, which is to find at least one PLMN to which the cell belongs (On each carrier, the UE shall search for the strongest cell and read its system information, in order to find out which of one or more PLMNs the cell belongs to). When the UE 1h-01 is able to read at least one PLMN identity in the cell having the strongest signal strength, the UE 1h-01 may report to the NAS layer that each found PLMN is a high-quality PLMN, provided that the following high-quality condition is fulfilled (If the UE can read one or several PLMN identities in the strongest cell, each found PLMN shall be reported to the NAS as a high quality PLMN (but without the RSRP value), provided that the following high-quality criterion is fulfilled).

High-quality condition: For an NR cell, an RSRP value is greater than or equal to −110 dBm (For an NR cell, the measured RSRP value shall be greater than or equal to −110 dBm)

When the found PLMNs do not fulfill the above high-quality condition but the UE 1h-01 is able to read PLMN identities, the UE 1h-01 may report RSRP measured values and the PLMN identities to the NAS layer (Found PLMNs that do not satisfy the high-quality criterion but for which the UE has been able to read the PLMN identities are reported to the NAS together with their corresponding RSRP values). Each measured value reported to the NAS layer may be a value for each PLMN found in each cell (The quality measure reported by the UE to NAS shall be the same for each PLMN found in one cell).

The PLMN selection procedure may not be performed in response to a request from the NAS layer (The search for PLMNs may be stopped on request from the NAS). The UE 1h-01 may optimize the PLMN selection procedure by using stored information (e.g., information about frequencies and cell parameters optionally obtainable from previously received measurement control information elements).

In operation 1h-15, when the UE 1h-01 in the RRC idle mode selects a PLMN, the UE 1h-01 may perform a cell selection procedure to select a suitable cell of the PLMN so as to camp on the suitable cell (Once the UE has selected a PLMN, the cell selection procedure shall be performed in order to select a suitable cell of that PLMN to camp on).

In operation 1h-20, the UE 1h-01 in the RRC idle mode may perform a cell reselection procedure to find a more suitable cell.

In operation 1h-25, the UE 1h-01 in the RRC idle mode may initiate an RRC connection establishment procedure with the NR gNB 1h-02. Upon initiation of the RRC connection establishment procedure, the UE 1h-01 may start a timer T300 (Upon initiation of the procedure, UE starts timer T300). Upon reception of an RRCSetup or RRCReject message from the NR gNB 1h-02, cell reselection, or suspension of the RRC connection establishment procedure by upper layers (upon reception of RRCSetup or RRCReject message, cell re-selection and upon abortion of connection establishment by upper layers), the UE 1h-01 may stop the running timer T300.

In operation 1h-30, the timer T300 that is started by the UE 1h-01 in operation 1h-25 may expire.

When the timer T300 expires, in operation 1h-35, the UE 1h-01 may perform the following action 1 and action 2 in order.

According to an embodiment of the disclosure, action 1 may be a first operation for processing a connection failure. For example, the first operation for processing the connection failure may not be related to reporting of the connection failure. However, embodiments of the disclosure are not limited to the above example. Also, the first operation may not be related to VarConnEstFailReport.

The first operation for processing the connection failure may include at least one of the following operations. Also, a plurality of operations among the following operations may be performed sequentially or continuously regardless of an order.—reset a MAC layer, release a configuration of the MAC layer, and re-establish an RLC layer for all RBs that are established (reset MAC, release the MAC configuration and re-establish RLC for all RBs that are established)

> when the timer T300 expired a consecutive connEstFailCount time on the same cell as a cell for which connEstFailureControl is included in SIB1, for a period indicated by connEstFailOffsetValidity, use connEstFailOffset for a parameter Qoffsettemp for a concerned cell when cell selection and reselection are performed (if the T300 has expired a consecutive connEstFailCount times on the same cell for which connEstFailureControl is included in SIB1, for a period as indicated by connEstFailOffsetValidity, use connEstFailOffset for the parameter Qoffsettemp for the concerned cell when performing cell selection and reselection according to TS 38.304 and TS 36.304)

According to an embodiment of the disclosure, action 2 may be a second operation for processing a connection failure. For example, the second operation for processing the connection failure may be related to reporting of the connection failure. However, embodiments of the disclosure are not limited to the above example. Also, the second operation may be related to VarConnEstFailReport.

The second operation for processing the connection failure may include at least one of the following operations. Also, a plurality of operations among the following operations may be performed sequentially or continuously regardless of an order.

when the UE has connection establishment failure information available in VarConnEstFailReport and the RPLMN is not identical to plmn-Identity stored in the VarConnEstFailReport, reset numberOfConnFail to 0 (if the UE has connection establishment failure information available in VarConnEstFailReport and if the RPLMN is not equal to plmn-identity stored in VarConnEstFailReport, reset the numberOfConnFail to 0; or if the failed cell is not the cell that UE has previously failed, reset the numberOfConnFail to 0)

In order to solve the problem 1 described above with reference to FIG. 1F, in the embodiment of the disclosure, the UE $1h$-$01$ may first perform the above operation. In addition, in a case where a cell on which the UE $1h$-$01$ previously camped (hereinafter, the previously camped-on cell) and a cell on which the UE $1h$-$01$ currently camps (the currently camped-on cell) are changed when the timer T300 expires, the UE $1h$-$01$ may reset the numberOfConnFail to 0. That is, this is because only when the UE $1h$-$01$ accumulatively counts a value of the numberOfConnFail when a cell on which the UE $1h$-$01$ camps on is not changed, the NR gNB $1h$-$02$ can identify the number of times the timer T300 expired for one cell. When the numberOfConnFail is not processed as described above, it may result in the UE $1h$-$01$ reporting incorrect information to the NR gNB $1h$-$02$. For reference, the UE $1h$-$01$ may identify that the previously camped-on cell and the currently camped-on cell are changed, through at least one of the following methods.

Method 1: When a global cell identity of the currently camped-on cell (or a current cell) does not belong to or are different from a cell identity and PLMN identity stored in measResultFailedCell of VarConnEstFailReport, the UE $1h$-$01$ may identify that the previously camped-on cell and the currently camped-on cell are changed.

Global cell identity: An identity to uniquely identify an NR cell, which is composed of cellIdentity and plmn-Identity of a first PLMN-identity in plmn-IdentityList. (Global cell identity: An identity to uniquely identifying an NR cell. It is consisted of cellIdentity and plmn-Identity of the first PLMN-Identity in plmn-IdentityList in SIB1.)

Method 2: When a global cell identity of the currently camped-on cell (or a current cell) and a tracking area code mapped thereto do not belong to or are different from a cell identity, PLMN identity, and a tracking area code stored in measResultFailedCell of VarConnEstFailReport, the UE $1h$-$01$ may identify that the previously camped-on cell and the currently camped-on cell are changed.

The tracking area code mapped to the global cell identity of the currently camped-on cell may refer to a tracking area code broadcast in PLMN-IdentityInfo to which a global cell identity broadcast in SIB1 belongs.

Method 3: When a cell identity of the currently camped-on cell (a current cell) does not belong to or is different from a cell identity stored in measResultFailedCell of VarConnEstFailReport, the UE $1h$-$01$ may identify that the previously camped-on cell and the currently camped-on cell are changed.

In order to solve the problem 1 described above with reference to FIG. 1F, in the embodiment of the disclosure, the UE $1h$-$01$ may perform the following operations after the above operations.

clear content included in VarConnEstFailReport except for numberOfConnFail, if any (clear the content included in VarConnEstFailReport except for the numberOfConnFail, if any)

store the following connection establishment failure information in VarConnEstFailReport by configuring its fields as follows (store the following connection establishment failure information in the VarConnEstFailReport by setting its fields as follows):

configure plmn-Identity to the RPLMN if available. Otherwise, configure plmn-Identity to a PLMN selected by upper layers (see TS 23.122 and TS 24.501) from among PLMNs included in plmn-IdentityList in SIB1 (set the plmn-Identity to the registered PLMN if available. Otherwise, set the plmn-Identity to the PLMN selected by upper layers (see TS 23.122, TS 24.501) from the one or more PLMNs included in the plmn-IdentityList in SIB1)

In order to solve the problem 2 described above with reference to FIG. 1F, in the embodiment, when a plmn-Identity value for the RPLMN exists, the UE $1h$-$01$ may store the plmn-Identity value, and only when the plmn-Identity value does not exist, the UE $1h$-$01$ may perform a PLMN selection procedure. The PLMN selection procedure may always be performed.

configure measResultFailedCell to include a global cell identity, a tracking area code, a physical cell ID, RSRP, and RSRQ of a failed cell based on available SSB measurements collected up to a moment the UE $1h$-$01$ detected a connection establishment failure (set the measResultFailedCell to include the global cell identity, tracking area code, physical cell id, the RSRP, and RSRQ, of the failed cell based on the available SSB measurements collected up to the moment the UE detected connection establishment failure)

if available, configure measResultNeighCells in descending order of ranking criterion used for cell reselection, to include neighboring cell measurements for at most the following number of neighboring cells (if available, set the measResultNeighCells, in order of decreasing ranking-criterion as used for cell re-selection, to include neighboring cell measurements for at most the following number of neighboring cells): 6 intra-frequency and 3 inter-frequency neighbors per frequency as well as 3 inter-RAT neighbors per frequency/set of frequencies per RAT, and according to the following: for each neighboring cell included, include optional fields that are available (6 intra-frequency and 3 inter-frequency neighbors per frequency as well as 3 inter-RAT neighbors, per frequency/set of frequencies per RAT and according to the following: for each neighbor cell included, include the optional fields that are available)

if available, configure locationInfo as follows (if available, set the locationInfo as follows):
  if available, configure commonLocationInfo to include detailed location information (if available, set the commonLocationInfo to include the detailed location information)
  if available, configure bt-LocationInfo to include Bluetooth measurement results in descending order of RSSI for Bluetooth beacons (if available, set the bt-LocationInfo to include the Bluetooth measurement results, in order of decreasing RSSI for Bluetooth beacons)
  if available, configure wlan-LocationInfo to include WLAN measurement results in descending order of RS SI for WLAN APs (if available, set the wlan-LocationInfo to include the WLAN measurement results, in order of decreasing RSSI for WLAN APs)
  if available, configure sensor-LocationInfo to include sensor measurement results (if available, set the sensor-LocationInfo to include the sensor measurement results)
configure perRAInfoList to indicate random access failure information (set perRAInfoList to indicate random access failure information)
when the numberOfConnFail is smaller than 7, increase the numberOfConnFail by 1 (if the numberOfConnFail is smaller than 7, increment the numberOfConnFail by 1)
inform the upper layers of an RRC connection establishment failure at a time point when the procedure ends (inform upper layers about the failure to establish the RRC connection, upon which the procedure ends)

In operation 1*h*-40, the UE 1*h*-01 in the RRC idle mode may initiate an RRC connection establishment procedure with the NR gNB 1*h*-02. Upon initiation of the RRC connection establishment procedure, the UE 1*h*-01 may start a timer T300 (Upon initiation of the procedure, UE starts timer T300).

In operation 1*h*-45, the UE 1*h*-01 in the RRC idle mode may transmit an RRCSetupRequest message to the NR gNB 1*h*-02.

In operation 1*h*-50, the NR gNB 1*h*-02 may transmit an RRCSetup message to the UE 1*h*-01 in the RRC idle mode. The UE 1*h*-01 that received the RRCSetup message may transition to the RRC connection mode after applying information included in the RRCSetup message.

In operation 1*h*-55, when the connection establishment failure information is included in the VarConnEstFailReport and it is determined that the plmn-Identity stored in the VarConnEstFailReport is identical to the RPLMN, the UE 1*h*-01 that transitioned to the RRC connection mode may transmit a connEstFailInfoAvailable indicator in an RRCSetupComplete message to the NR gNB 1*h*-02.

In operation 1*h*-60, when the connection establishment failure information is included in the VarConnEstFailReport and it is determined that the plmn-Identity stored in the VarConnEstFailReport is identical to the RPLMN, the UE 1*h*-01 in the RRC connection mode may transmit, to the NR gNB 1*h*-02, a connEstFailInfoAvailable indicator in an RRCReconfigurationComplete message or an RRCReestablishmentComplete message.

In operation 1*h*-65, the NR gNB 1*h*-02 may transmit a UEInformationRequest message to the UE 1*h*-01 by configuring connEstFailReportReq to true in the UEInformationRequest message.

In operation 1*h*-70, when connEstFailReportReq is configured to true in the received UEInformationRequest message, the connection establishment failure information is included in the VarConnEstFailReport, and it is determined that the plmn-Identity stored in the VarConnEstFailReport is identical to the RPLMN, the UE 1*h*-01 may transmit a UEInformationResponse message to the NR gNB 1*h*-02 by performing the following operations.

configure timeSinceFailure in VarConnEstFailReport to a time elapsed since a last connection establishment failure in NR (set timeSinceFailure in VarConnEstFailReport to the time that elapsed since the last connection establishment failure in NR)

configure connEstFailReport in a UEInformationResponse message to a value of connEstFailReport in VarConnEstFailReport (set the connEstFailReport in the UEInformationResponse message to the value of connEstFailReport in VarConnEstFailReport)

When it is confirmed by a lower layer that the UEInformationResponse message is successfully transmitted, the UE 1*h*-01 may discard connEstFailReport from VarConnEstFailReport (discard the connEstFailReport from VarConnEstFailReport upon successful delivery of the UEInformationResponse message confirmed by lower layers).

FIG. 1I is a flowchart of a procedure in which a UE 1*i*-01 collects RRC connection resume failure information and reports the same to an NR gNB 1*i*-02 in an NR system, proposed according to an embodiment of the disclosure.

The RRC connection resume failure information according to the embodiment of the disclosure may be interpreted in the same meaning as the RRC connection establishment failure information.

Referring to FIG. 1I, in operation 1*i*-03, the UE 1*i*-01 may establish an RRC connection with the NR gNB 1*i*-02 and thus be in an RRC connection mode (RRC_CONNECTED).

In operation 1*i*-04, the NR gNB 1*i*-02 may transmit an RRCRelease message including suspend configuration information (suspendConfig) to the UE 1*i*-01.

In operation 1*i*-05, the UE 1*i*-01 that received the RRCRelease message including the suspend configuration information (suspendConfig) may transition to an RRC inactive mode (RRC_INACTIVE).

In operation 1*i*-10, the UE 1*i*-01 in the RRC inactive mode may perform a cell selection procedure to select a suitable cell to be camped on.

In operation 1*i*-20, the UE 1*i*-01 in the RRC inactive mode may perform a cell reselection procedure to find a more suitable cell.

In operation 1*i*-25, the UE 1*i*-01 in the RRC inactive mode may initiate an RRC connection resume procedure with the NR gNB 1*i*-02. Upon initiation of the RRC connection resume procedure, the UE 1*i*-01 may start a timer T319 (Upon initiation of the procedure, UE starts timer T319). Upon reception of an RRCResume, RRCSetup, RRCRelease without suspendConfig, RRCRelease with suspendConfig, or RRCReject message from the NR gNB 1*i*-02, cell reselection, or suspension of the RRC connection establishment procedure by upper layers, the UE 1*i*-01 may stop the running timer T319.

In operation 1*i*-30, the timer T319 which is started by the UE 1*i*-01 in operation 1*i*-25 may expire or the UE 1*i*-01 may receive an integrity check failure indication from a lower layer while the timer T319 is running.

As soon as the timer T319 which is started by the UE 1i-01 expires or the integrity check failure indication is received from the lower layer while the timer T319 is running, in operation 1i-35, the UE 1i-01 may perform the following action 1 and action 2 in order.

According to an embodiment of the disclosure, action 1 may be a first operation for processing a connection failure. For example, the first operation for processing the connection failure may not be related to reporting of the connection failure. However, embodiments of the disclosure are not limited to the above example. Also, the first operation may not be related to VarConnEstFailReport.

The first operation for processing the connection failure may include at least one of the following operations. Also, a plurality of operations among the following operations may be performed sequentially or continuously regardless of an order.

when the UE 1i-01 has connection resume failure information available in VarConnEstFailReport and the RPLMN is not identical to plmn-Identity stored in VarConnEstFailReport, reset numberOfConnFail to 0, or when a failed cell is not a cell that the UE 1i-01 has previously failed, reset numberOfConnFail to 0 (if the UE has connection resume failure information available in VarConnEstFailReport and if the RPLMN is not equal to plmn-identity stored in VarConnEstFailReport, reset the numberOfConnFail to 0; or if the failed cell is not the cell that UE has previously failed, reset the numberOfConnFail to 0)

In order to solve the problem 1 described above with reference to FIG. 1G, in the embodiment of the disclosure, the UE 1i-01 may first perform the above operation. In addition, when the timer T319 expires or in a case where an integrity check failure occurs while the timer T319 is running, when a previously camped-on cell and a currently camped-on cell are changed, the UE 1i-01 may reset numberOfConnFail to 0. For reference, the aforementioned embodiments may be used for a method by which a UE identifies that a previously camped-on cell and a currently camped-on cell are changed.

In order to solve the problem 1 described above with reference to FIG. 1G, in the embodiment of the disclosure, the UE 1i-01 may perform the following operations after the above operations.

clear content included in VarConnEstFailReport except for numberOfConnFail (clear the content included in VarConnEstFailReport except for the numberOfConnFail), if any store the following connection failure information in VarConnEstFailReport by configuring its fields as follows (store the following connection resume failure information in the VarConnEstFailReport by setting its fields as follows):

if available, configure plmn-Identity to the RPLMN (set the plmn-Identity to the registered PLMN)

In order to solve the problem 2 described above with reference to FIG. 1G, in the embodiment, the UE 1i-01 may configure a plmn-Identity value for the RPLMN in VarConnEstFailReport. That is, the UE 1i-01 in the RRC inactive mode may configure the plmn-Identity value for the RPLMN in VarConnEstFailReport without performing a PLMN selection procedure. When a PLMN reselection procedure is performed, the aforementioned embodiments may be used with reference to FIG. 1G.

configure measResultFailedCell to include a global cell identity, a tracking area code, a physical cell ID, RSRP, and RSRQ of a failed cell based on available SSB measurements collected up to a moment the UE 1i-01 detected a connection establishment failure (set the measResultFailedCell to include the global cell identity, tracking area code, physical cell id, the RSRP, and RSRQ, of the failed cell based on the available SSB measurements collected up to the moment the UE detected connection establishment failure)

if available, configure measResultNeighCells in descending order of ranking criterion used for cell reselection, to include neighboring cell measurements for at most the following number of neighboring cells (if available, set the measResultNeighCells, in order of decreasing ranking-criterion as used for cell re-selection, to include neighboring cell measurements for at most the following number of neighboring cells): 6 intra-frequency and 3 inter-frequency neighbors per frequency as well as 3 inter-RAT neighbors per frequency/set of frequencies per RAT, and according to the following: for each neighboring cell included, include optional fields that are available (6 intra-frequency and 3 inter-frequency neighbors per frequency as well as 3 inter-RAT neighbors, per frequency/set of frequencies per RAT and according to the following: for each neighbor cell included, include the optional fields that are available)

if available, configure locationInfo as follows (if available, set the locationInfo as follows):

if available, configure commonLocationInfo to include detailed location information (if available, set the commonLocationInfo to include the detailed location information)

if available, configure bt-LocationInfo to include Bluetooth measurement results in descending order of RSSI for Bluetooth beacons (if available, set the bt-LocationInfo to include the Bluetooth measurement results, in order of decreasing RSSI for Bluetooth beacons)

if available, configure wlan-LocationInfo to include WLAN measurement results in descending order of RS SI for WLAN APs (if available, set the wlan-LocationInfo to include the WLAN measurement results, in order of decreasing RSSI for WLAN APs)

if available, configure sensor-LocationInfo to include sensor measurement results (if available, set the sensor-LocationInfo to include the sensor measurement results)

configure perRAInfoList to indicate random access failure information (set perRAInfoList to indicate random access failure information)

when the numberOfConnFail is smaller than 7, increase the numberOfConnFail by 1 (if the numberOfConnFail is smaller than 7, increment the numberOfConnFail by 1)

According to an embodiment of the disclosure, action 2 may be a second operation for processing a connection failure. For example, the second operation for processing the connection failure may be related to reporting of the connection failure. However, embodiments of the disclosure are not limited to the above example. Also, the second operation may be related to VarConnEstFailReport.

The second operation for processing the connection failure may include at least one of the following operations.

Also, a plurality of operations among the following operations may be performed sequentially or continuously regardless of an order.

perform an action as specified in 3GPP TS 38.331 5.3.11 for a release cause of "RRC Resume failure" (perform the actions upon going to RRC_IDLE as specified in 3GPP TS 38.331 5.3.11 with release cause 'RRC Resume failure')

In operation 1i-36, the UE 1i-01 is in the RRC idle mode. In operation 1i-40, the UE 1i-01 in the RRC idle mode may initiate an RRC connection establishment procedure with the NR gNB 1i-02. Upon initiation of the RRC connection establishment procedure, the UE 1i-01 may start a timer T300 (Upon initiation of the procedure, UE starts timer T300).

In operation 1i-45, the UE 1i-01 in the RRC idle mode may transmit an RRCSetupRequest message to the NR gNB 1i-02.

In operation 1i-50, the NR gNB 1i-02 may transmit an RRCSetup message to the UE 1i-01 in the RRC idle mode. The UE 1i-01 that received the RRCSetup message may transition to the RRC connection mode after applying information included in the RRCSetup message.

In operation 1i-55, when the connection establishment failure information is included in the VarConnEstFailReport and it is determined that the plmn-Identity stored in the VarConnEstFailReport is identical to the RPLMN, the UE 1i-01 that transitioned to the RRC connection mode may transmit a connEstFailInfoAvailable indicator in an RRCSetupComplete message, to the NR gNB 1i-02.

In operation 1i-60, when the connection establishment failure information is included in the VarConnEstFailReport and it is determined that the plmn-Identity stored in the VarConnEstFailReport is identical to the RPLMN, the UE 1i-01 in the RRC connection mode may transmit, to the NR gNB 1i-02, a connEstFailInfoAvailable indicator in an RRCReconfigurationComplete message or an RRCReestablishmentComplete message.

In operation 1i-65, the NR gNB 1i-02 may transmit a UEInformationRequest message to the UE 1i-01 by configuring connEstFailReportReq to true in the UEInformationRequest message.

In operation 1i-70, when connEstFailReportReq is configured to true in the received UEInformationRequest message, the connection establishment failure information is included in the VarConnEstFailReport, and it is determined that the plmn-Identity stored in the VarConnEstFailReport is identical to the RPLMN, the UE 1i-01 may transmit a UEInformationResponse message to the NR gNB 1i-02 by performing the following operations.

configure timeSinceFailure of VarConnEstFailReport to a time elapsed since a last connection establishment failure in NR (set timeSinceFailure in VarConnEstFailReport to the time that elapsed since the last connection establishment failure in NR)

configure connEstFailReport in a UEInformationResponse message to a value of connEstFailReport in VarConnEstFailReport (set the connEstFailReport in the UEInformationResponse message to the value of connEstFailReport in VarConnEstFailReport)

When it is confirmed by a lower layer that the UEInformationResponse message is successfully transmitted, the UE 1i-01 may discard connEstFailReport from VarConnEstFailReport (discard the connEstFailReport from VarConnEstFailReport upon successful delivery of the UEInformationResponse message confirmed by lower layers).

Figure 1J:
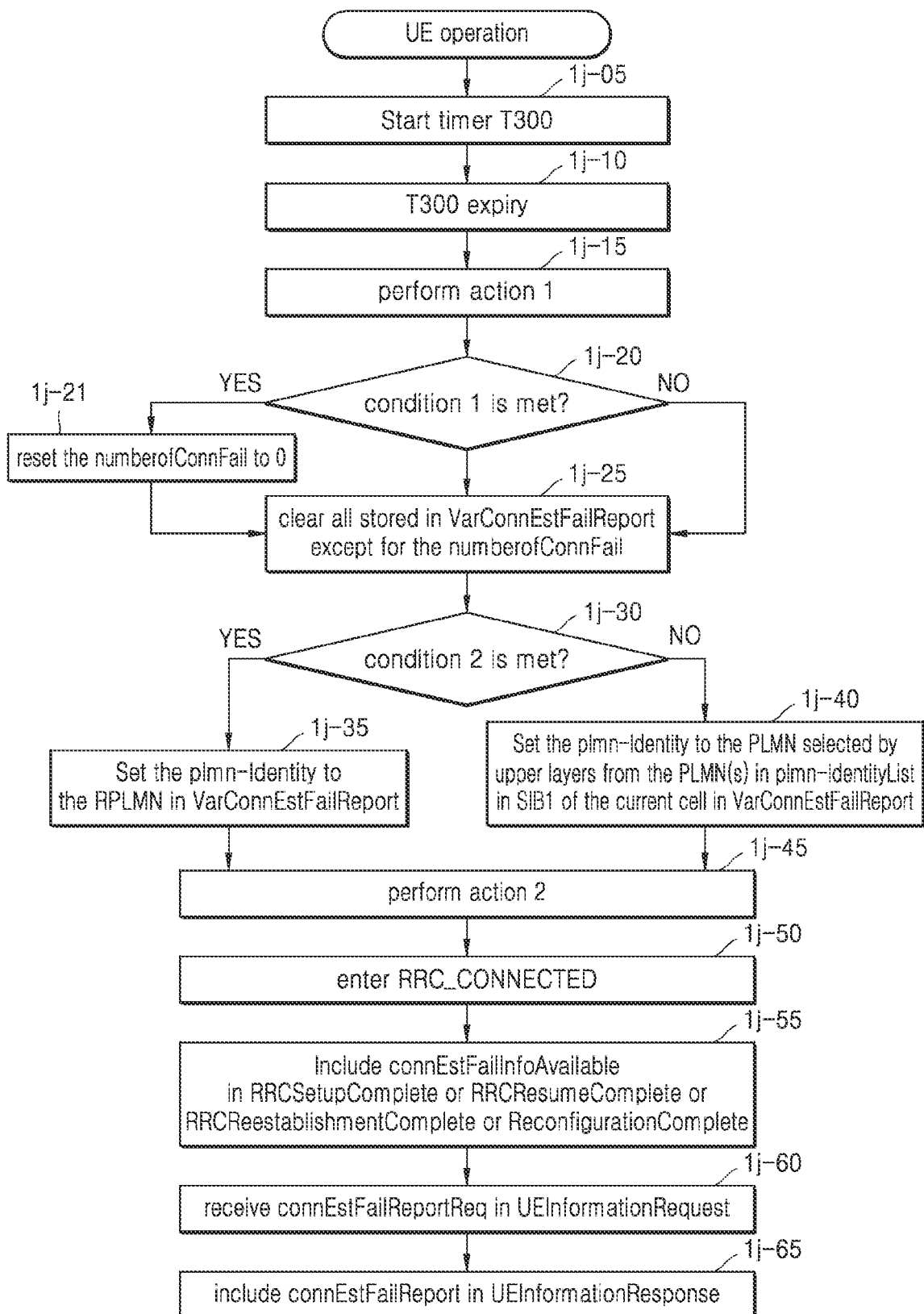
FIG. 1J is a flowchart of terminal operations in which a terminal (e.g. UE) collects RRC connection establishment failure information and reports the same to an NR base station in an NR system, proposed according to an embodiment of the disclosure.

FIG. 1J is a flowchart of UE operations in which a UE collects RRC connection establishment failure information and reports the same to an NR gNB in an NR system, proposed according to an embodiment of the disclosure.

Referring to FIG. 1J, a UE in an RRC idle mode may initiate an RRC connection establishment procedure with the NR gNB. Upon initiation of the RRC connection establishment procedure, the UE may start a timer T300 in operation 1j-05 (Upon initiation of the procedure, UE starts timer T300).

In operation 1j-10, the timer T300 that is started in operation 1j-05 may expire.

In operation 1j-15, the UE may perform the following Action 1. According to an embodiment of the disclosure, action 1 may be a first operation for processing a connection failure. The first operation for processing the connection failure may include at least one of the following operations. Also, a plurality of operations among the following operations may be performed sequentially or continuously regardless of an order.

Action 1 reset a MAC layer, release a configuration of the MAC layer, and re-establish an RLC layer for all RBs that are established (reset MAC, release the MAC configuration and re-establish RLC for all RBs that are established)

when the timer T300 expired a consecutive connEstFailCount time on the same cell as a cell for which connEstFailureControl is included in system information block 1 (SIB1), for a period indicated by connEstFailOffsetValidity, use connEstFailOffset for a parameter Qoffsettemp for a concerned cell when cell selection and reselection are performed (if the T300 has expired a consecutive connEstFailCount times on the same cell for which connEstFailureControl is included in SIB1, for a period as indicated by connEstFailOffsetValidity, use connEstFailOffset for the parameter Qoffsettemp for the concerned cell when performing cell selection and reselection according to TS 38.304 and TS 36.304)

In operation 1j-20, the UE may determine whether the following condition 1 is fulfilled (met).

Condition 1 when the UE has connection establishment failure information available in VarConnEstFailReport and the RPLMN is not identical to plmn-Identity stored in VarConnEstFailReport, or a failed cell is not a cell that the UE has previously failed (if the UE has connection establishment failure information available in VarConnEstFailReport and if the RPLMN is not equal to plmn-identity stored in VarConnEstFailReport or if the failed cell is not the cell that UE has previously failed)

When the UE determines that the above condition 1 is fulfilled in operation 1j-20, the UE may reset numberOfConnFail to 0 in operation 1j-21. Also, in operation 1j-25, the UE may discard (clear) all information stored in the VarConnEstFailReport except for the numberOfConnFail.

When the UE determines that the above condition 1 is not fulfilled in operation 1j-20, the UE may discard all information stored in the VarConnEstFailReport except for the numberOfConnFail, in operation 1j-25. That is, the UE may not reset the numberOfConnFail to 0.

In operation 1j-30, the UE may determine whether the following condition 2 is fulfilled.

Condition 2 whether the RPLMN is available (registered PLMN is available)

When the UE determines that condition 2 is fulfilled in operation 1j-30, the UE may configure plmn-Identity for the RPLMN in the VarConnEstFailReport in operation 1j-35.

Also, the UE may perform the following action 2 in operation 1*j*-45. That is, the UE may store connection establishment failure information in the VarConnEstFailReport by performing the following action 2. According to an embodiment of the disclosure, action 2 may include at least one of the following operations. Also, a plurality of operations among the following operations may be performed sequentially or continuously regardless of an order.

Action 2
- configure measResultFailedCell to include a global cell ID, a tracking area code, a physical cell ID, RSRP, and RSRQ of a failed cell, based on available SSB measurements collected up to a time point at which the UE detected a connection establishment failure (set the measResultFailedCell to include the global cell identity, tracking area code, physical cell id, the RSRP, and RSRQ, of the failed cell based on the available SSB measurements collected up to the moment the UE detected connection establishment failure)
- if available, configure measResultNeighCells in descending order of ranking criterion used for cell reselection, to include neighboring cell measurements for at most the following number of neighboring cells (if available, set the measResultNeighCells, in order of decreasing ranking-criterion as used for cell re-selection, to include neighboring cell measurements for at most the following number of neighboring cells): 6 intra-frequency and 3 inter-frequency neighbors per frequency as well as 3 inter-RAT neighbors per frequency/set of frequencies per RAT, and according to the following: for each neighboring cell included, include optional fields that are available (6 intra-frequency and 3 inter-frequency neighbors per frequency as well as 3 inter-RAT neighbors, per frequency/set of frequencies per RAT and according to the following: for each neighbor cell included, include the optional fields that are available)
- 4) if available, configure locationInfo as follows (if available, set the locationInfo as follows):
  - if available, configure commonLocationInfo to include detailed location information (if available, set the commonLocationInfo to include the detailed location information)
  - if available, configure bt-LocationInfo to include Bluetooth measurement results in descending order of RSSI for Bluetooth beacons (if available, set the bt-LocationInfo to include the Bluetooth measurement results, in order of decreasing RSSI for Bluetooth beacons)
  - if available, configure wlan-LocationInfo to include WLAN measurement results in descending order of RS SI for WLAN APs (if available, set the wlan-LocationInfo to include the WLAN measurement results, in order of decreasing RSSI for WLAN APs)
  - if available, configure sensor-LocationInfo to include sensor measurement results (if available, set the sensor-LocationInfo to include the sensor measurement results)
- configure perRAlnfoList to indicate random access failure information (set perRAlnfoList to indicate random access failure information)
- when the numberOfConnFail is smaller than 7, increase the numberOfConnFail by 1 (if the numberOfConnFail is smaller than 7, increment the numberOfConnFail by 1)
- inform the upper layers of an RRC connection establishment failure at a time point when the procedure ends (inform upper layers about the failure to establish the RRC connection, upon which the procedure ends)

When the UE determines that condition 2 is not fulfilled in operation 1*j*-30, the UE may configure plmn-Identity to a PLMN selected by upper layers from among PLMNs included in plmn-IdentityList in SIB1 of a current cell in the VarConnEstFailReport (set the plmn-Identity to the PLMN selected by upper layers (see TS 23.122, TS 24.501) from the one or more PLMNs included in the plmn-IdentityList in SIB1) in operation 1*j*-40. Also, the UE may perform action 2 described in operation 1*j*-45.

In operation 1*j*-50, the UE may transition to (enter) an RRC connection mode.

In operation 1*j*-55, the UE may transmit, to the NR gNB, a connEstFailInfoAvailable in an RRCSetupComplete, RRCResumeComplete, RRCReestablishmentComplete, or RRCReconfigurationComplete message.

In operation 1*j*-60, the UE may receive a UEInformationRequest message including connEstFailReportReq from the NR gNB.

In operation 1*j*-65, the UE may transmit a UEInformationResponse message including connEstFailReport to the NR gNB.

Figure 1K:
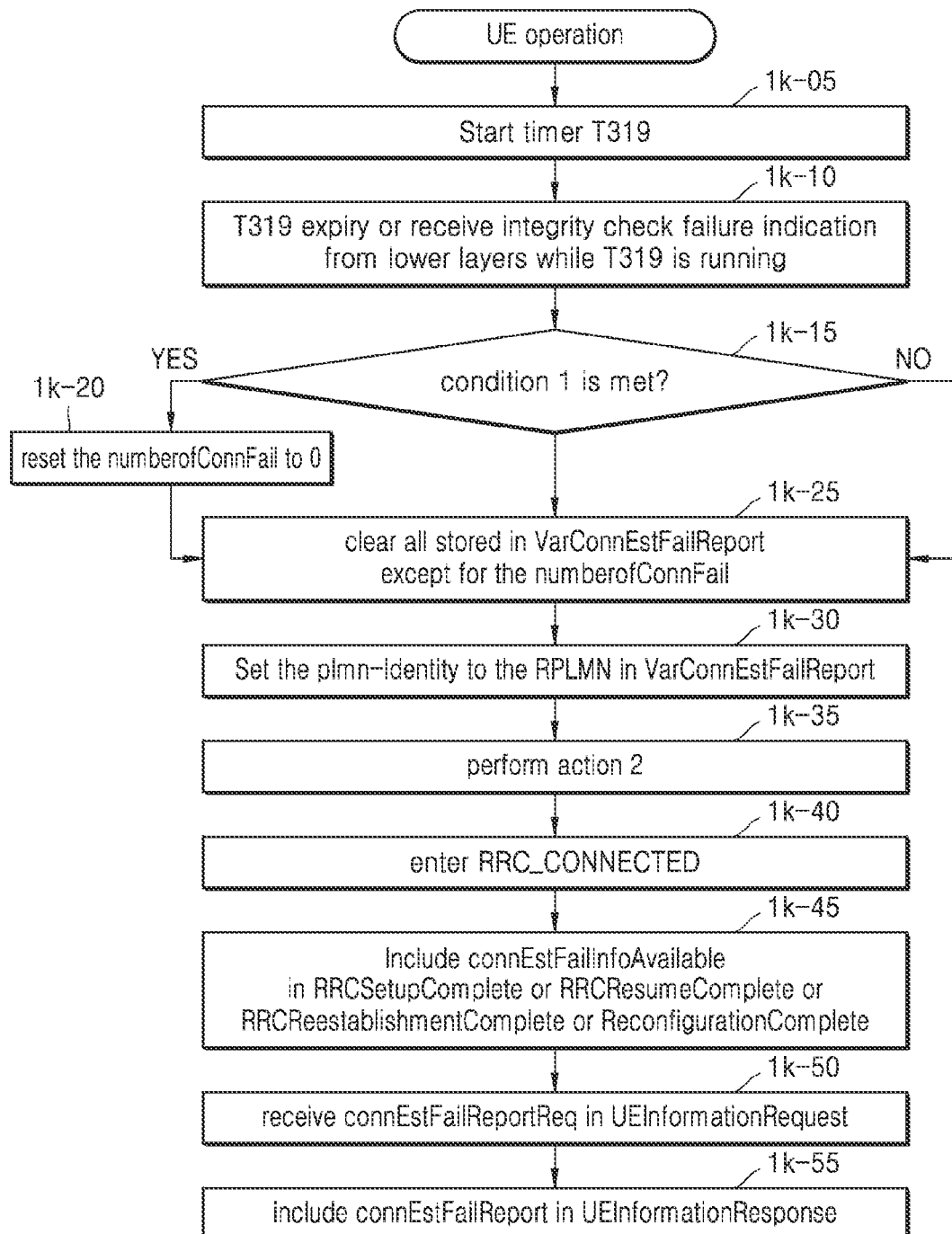
FIG. 1K is a flowchart of terminal operations in which a terminal (e.g. UE) collects RRC connection establishment failure information and reports the same to an NR base station in an NR system, proposed according to an embodiment of the disclosure.

FIG. 1K is a flowchart of UE operations in which a UE collects RRC connection establishment failure information and reports the same to an NR gNB in an NR system, proposed according to an embodiment of the disclosure.

Referring to FIG. 1K, a UE in an RRC inactive mode may initiate an RRC connection resume procedure with the NR gNB. Upon initiation of the RRC connection resume procedure, the UE may start a timer T319 in operation 1*k*-05 (Upon initiation of the procedure, UE starts timer T319).

In operation 1*k*-10, the timer T319 which is started in operation 1*k*-05 expires or the UE may receive an integrity check failure indication from a lower layer while the timer T319 is running.

In operation 1*k*-15, the UE may determine whether the following condition 1 is fulfilled.

Condition 1
- when the UE has connection establishment failure information available in VarConnEstFailReport and the RPLMN is not identical to plmn-Identity stored in VarConnEstFailReport, or a failed cell is not a cell that the UE has previously failed (if the UE has connection establishment failure information available in VarConnEstFailReport and if the RPLMN is not equal to plmn-identity stored in VarConnEstFailReport or if the failed cell is not the cell that UE has previously failed)

When the UE determines that condition 1 is fulfilled in operation 1*k*-15, the UE may reset numberOfConnFail to 0 in operation 1*k*-20. Also, in operation 1*k*-25, the UE may discard all information stored in the VarConnEstFailReport except for the numberOfConnFail.

When the UE determines that condition is not fulfilled in operation 1*k*-15, the UE may discard all information stored in the VarConnEstFailReport except for the numberOfConnFail, in operation 1*k*-25. That is, the UE may not reset the numberOfConnFail to 0.

In operation 1*k*-30, the UE may configure and store plmn-Identity for the RPLMN in the VarConnEstFailReport.

In operation 1*k*-35, the UE may perform the following action 1. That is, the UE may store connection resume failure information in the VarConnEstFailReport by performing the following action 1. According to an embodiment of the disclosure, action 1 may include at least one of the following operations. Also, a plurality of operations among the following operations may be performed sequentially or continuously regardless of an order.

Action 1 configure measResultFailedCell to include a global cell identity, a tracking area code, a physical cell ID, RSRP, and RSRQ of a failed cell based on available SSB measurements collected up to a moment the UE 1$i$-01 detected a connection establishment failure (set the measResultFailedCell to include the global cell identity, tracking area code, physical cell id, the RSRP, and RSRQ, of the failed cell based on the available SSB measurements collected up to the moment the UE detected connection establishment failure)

if available, configure measResultNeighCells in descending order of ranking criterion used for cell reselection, to include neighboring cell measurements for at most the following number of neighboring cells (if available, set the measResultNeighCells, in order of decreasing ranking-criterion as used for cell re-selection, to include neighboring cell measurements for at most the following number of neighboring cells): 6 intra-frequency and 3 inter-frequency neighbors per frequency as well as 3 inter-RAT neighbors per frequency/set of frequencies per RAT, and according to the following: for each neighboring cell included, include optional fields that are available (6 intra-frequency and 3 inter-frequency neighbors per frequency as well as 3 inter-RAT neighbors, per frequency/set of frequencies per RAT and according to the following: for each neighbor cell included, include the optional fields that are available)

if available, configure locationInfo as follows (if available, set the locationInfo as follows):

if available, configure commonLocationInfo to include detailed location information (if available, set the commonLocationInfo to include the detailed location information)

if available, configure bt-LocationInfo to include Bluetooth measurement results in descending order of RSSI for Bluetooth beacons (if available, set the bt-LocationInfo to include the Bluetooth measurement results, in order of decreasing RSSI for Bluetooth beacons)

if available, configure wlan-LocationInfo to include WLAN measurement results in descending order of RSSI for WLAN APs (if available, set the wlan-LocationInfo to include the WLAN measurement results, in order of decreasing RSSI for WLAN APs)

if available, configure sensor-LocationInfo to include sensor measurement results (if available, set the sensor-LocationInfo to include the sensor measurement results)

configure perRAInfoList to indicate random access failure information (set perRAInfoList to indicate random access failure information)

when the numberOfConnFail is smaller than 7, increase the numberOfConnFail by 1 (if the numberOfConnFail is smaller than 7, increment the numberOfConnFail by 1)

inform the upper layers of an RRC connection establishment failure at a time point when the procedure ends (inform upper layers about the failure to establish the RRC connection, upon which the procedure ends)

In operation 1$k$-40, the UE may transition to an RRC connection mode.

In operation 1$k$-45, the UE may transmit, to the NR gNB, a connEstFailInfoAvailable in an RRCSetupComplete, RRCResumeComplete, RRCReestablishmentComplete, or RRCReconfigurationComplete message.

In operation 1$k$-50, the UE may receive a UEInformationRequest message including connEstFailReportReq from the NR gNB.

In operation 1$k$-55, the UE may transmit a UEInformationResponse message including connEstFailReport to the NR gNB.

Figure 1L:
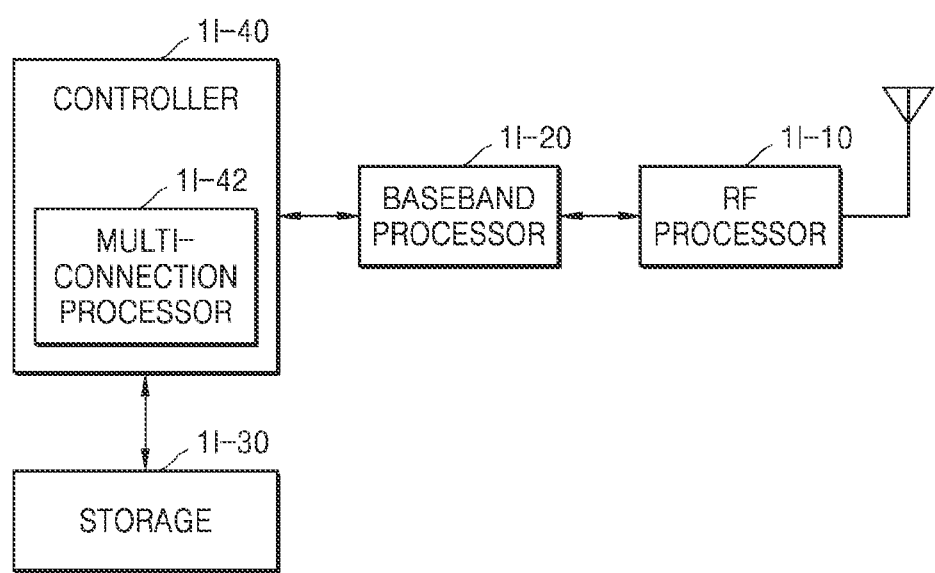
FIG. 1L is a block diagram illustrating an internal structure of a terminal (e.g. UE), according to an embodiment of the disclosure.

FIG. 1L is a block diagram illustrating an internal structure of a UE, according to an embodiment of the disclosure.

Referring to FIG. 1L, the UE may include a radio frequency (RF) processor 1$l$-10, a baseband processor 1$l$-20, a storage 1$l$-30, and a controller 1$l$-40. However, the internal structure of the UE is not limited to elements shown in FIG. 1L, and may be implemented with more elements than the elements shown in FIG. 1L.

The RF processor 1$l$-10 may perform functions, such as band-band conversion, amplification, etc., to transmit or receive signals on a radio channel. That is, the RF processor 1$l$-10 may up-convert a baseband signal provided from the baseband processor 1$l$-20 into an RF band signal and transmit the same through an antenna and may down-convert an RF band signal received through the antenna into a baseband signal. For example, the RF processor 1$l$-10 may include a transmission filter, a reception filter, an amplifier, a mixer, an oscillator, a digital-to-analog converter (DAC), and an analog-to-digital converter (ADC). Although only one antenna is illustrated in FIG. 1L, the UE may include a plurality of antennas. Also, the RF processor 1$l$-10 may include a plurality of RF chains. In addition, the RF processor 1$l$-10 may perform beamforming. For beamforming, the RF processor 1$l$-10 may adjust the phases and magnitudes of signals transmitted and received through a plurality of antennas or antenna elements. Also, the RF processor 1$l$-10 may perform MIMO, and may receive multiple layers during a MIMO operation.

The baseband processor 1$l$-20 may perform a conversion function between a baseband signal and a bit string according to a physical layer standard of a system. For example, during data transmission, the baseband processor 1$l$-20 may generate complex symbols by encoding and modulating a transmit bit string. Also, during data reception, the baseband processor 1$l$-20 may reconstruct a received bit string by demodulating and decoding the baseband signal provided from the RF processor 1$l$-10. For example, according to an OFDM scheme, during data transmission, the baseband processor 1$l$-20 may generate complex symbols by encoding and modulating a transmit bit string, map the complex symbols to subcarriers, and then configure OFDM symbols through an inverse fast Fourier transform (IFFT) operation and cyclic prefix (CP) insertion. Also, during data reception, the baseband processor 1$l$-20 may segment the baseband signal provided from the RF processor 1$l$-10 in units of OFDM symbols, reconstruct signals mapped to the subcarriers through a fast Fourier transform (FFT) operation, and then reconstruct a received bit string through demodulation and decoding.

The baseband processor 1$l$-20 and the RF processor 1$l$-10 transmit and receive signals as described above. Accordingly, the baseband processor 1$l$-20 and the RF processor 1$l$-10 may be referred to as a transmitter, a receiver, a transceiver, or a communicator. Furthermore, at least one of the baseband processor 1$l$-20 or the RF processor 1$l$-10 may include a plurality of communication modules so as to support a plurality of different radio access technologies. Also, at least one of the baseband processor 1$l$-20 or the RF processor 1$l$-10 may include a plurality of communication modules to process signals of different frequency bands. For example, the different radio access technologies may include a wireless LAN (e.g., IEEE 802.11), a cellular network (e.g., LTE), etc. Also, the different frequency bands may include a super high frequency (SHF) (e.g., 2.NRHz or NRhz) band and a millimeter wave (mmWave) (e.g., 60 GHz) band.

The storage 1*l*-30 may store data such as a basic program, an application program, or configuration information for operation of the UE. In particular, the storage 1*l*-30 may store information related to a second access node that performs wireless communication using a second radio access technology. The storage 1*l*-30 may provide stored data in response to a request from the controller 1*l*-40. The storage 1*l*-30 may be configured with a storage medium, such as read only memory (ROM), random access memory (RAM), a hard disc, compact disc ROM (CD-ROM), digital versatile disc (DVD), and the like, or a combination of storage mediums. Also, the storage 1*l*-30 may include a plurality of memories.

The controller 1*l*-40 may control overall operations of the UE. For example, the controller 1*l*-40 may transmit and receive signals through the baseband processor 1*l*-20 and the RF processor 1*l*-10. Also, the controller 1*l*-40 may write and read data to and from the storage 1*l*-30. For this purpose, the controller 1*l*-40 may include at least one processor 1*l*-42. For example, the controller 1*l*-40 may include a communication processor (CP) for performing control for communication and an application processor (AP) for controlling an upper layer such as an application program. Also, the controller 1*l*-40 may control the UE to perform a method of collecting and reporting RRC connection establishment and resume failure information described above. Also, at least one element of the UE may be implemented as a single chip.

Figure 1M:
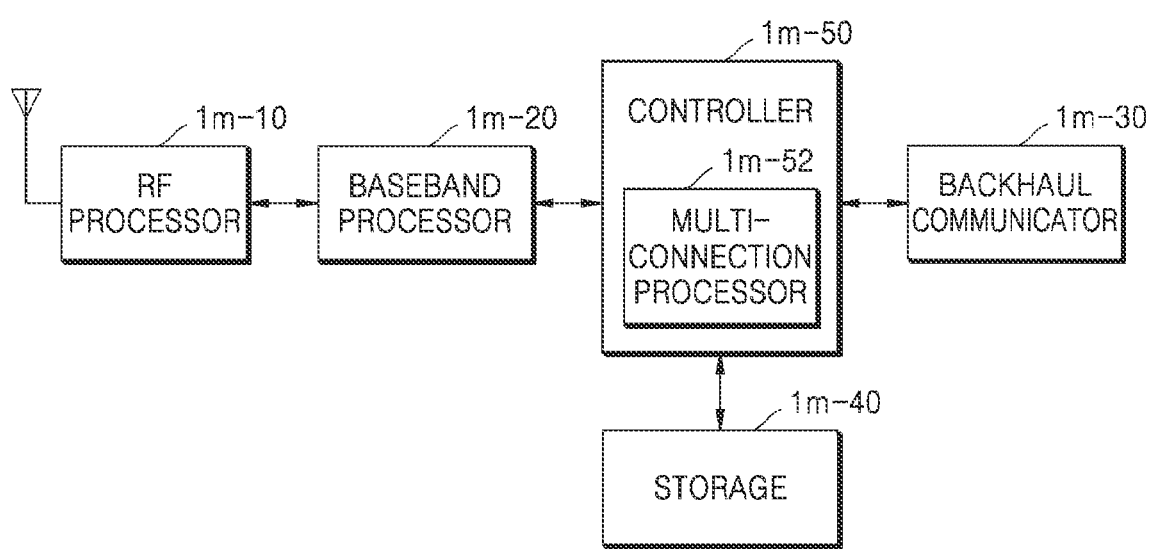
FIG. 1M is a block diagram illustrating an architecture of an NR base station, according to an embodiment of the disclosure.

FIG. 1M is a block diagram illustrating an architecture of an NR base station, according to an embodiment of the disclosure.

Referring to FIG. 1M, the NR base station may include an RF processor 1*m*-10, a baseband processor 1*m*-20, a backhaul communicator 1*m*-30, a storage 1*m*-40, and a controller 1*m*-50. However, an internal structure of the base station is not limited to elements shown in FIG. 1M, and may be implemented with more elements than the elements shown in FIG. 1M.

The RF processor 1*m*-10 performs functions, such as signal-band conversion, amplification, etc., to transmit and receive signals on a radio channel. That is, the RF processor 1*m*-10 may up-convert a baseband signal provided from the baseband processor 1*m*-20 into an RF band signal and transmit the same through an antenna and may down-convert an RF band signal received through the antenna into a baseband signal. For example, the RF processor 1*m*-10 may include a transmission filter, a reception filter, an amplifier, a mixer, an oscillator, a DAC, and an ADC. Although only one antenna is illustrated in FIG. 1M, a first access node may include a plurality of antennas. Also, the RF processor 1*m*-10 may include a plurality of RF chains. In addition, the RF processor 1*m*-10 may perform beamforming. For beamforming, the RF processor 1*m*-10 may adjust the phases and magnitudes of signals transmitted and received through a plurality of antennas or antenna elements. The RF processor 1*m*-10 may perform a DL MIMO operation by transmitting one or more layers.

The baseband processor 1*m*-20 may perform a conversion function between a baseband signal and a bit string according to a physical layer standard of a first radio access technology. For example, during data transmission, the baseband processor 1*m*-20 may generate complex symbols by encoding and modulating a transmit bit string. Also, during data reception, the baseband processor 1*m*-20 may reconstruct a received bit string by demodulating and decoding the baseband signal provided from the RF processor 1*m*-10. For example, according to the OFDM scheme, during data transmission, the baseband processor 1*m*-20 may generate complex symbols by encoding and modulating a transmit bit string, map the complex symbols to subcarriers, and then configure OFDM symbols through an IFFT operation and CP insertion. Also, during data reception, the baseband processor 1*m*-20 may segment the baseband signal provided from the RF processor 1*m*-10 into units of OFDM symbols, reconstruct signals mapped to the subcarriers through an FFT operation, and then reconstruct a received bit string through demodulation and decoding. The baseband processor 1*m*-20 and the RF processor 1*m*-10 may transmit and receive signals as described above. Accordingly, the baseband processor 1*m*-20 and the RF processor 1*m*-10 may be referred to as a transmitter, a receiver, a transceiver, a communicator, or a wireless communicator.

The backhaul communicator 1*m*-30 may provide an interface for communicating with other nodes in the network. That is, the backhaul communicator 1*m*-30 may convert a bit string transmitted from a main base station to another node, for example, an auxiliary base station, a core network, etc., into a physical signal, and convert a physical signal received from another node into a bit string.

The storage 1*m*-40 may store data such as a basic program, an application program, or configuration information for operation of the main base station. In particular, the storage 1*m*-40 may store information about a bearer allocated to a connected UE, a measurement result reported from the connected UE, or the like. Also, the storage 1*m*-40 may store information that is a reference for determining whether to provide or terminate multiple connections to the UE. The storage 1*m*-40 may provide stored data in response to a request from the controller 1*m*-50. The storage 1*m*-40 may include a storage medium such as a ROM, a RAM, a hard disk, a CD-ROM, and a DVD, or a combination of storage mediums. Also, the storage 1*m*-40 may include a plurality of memories.

The controller 1*m*-50 controls overall operations of the main base station. For example, the controller 1*m*-50 may transmit and receive signals through the baseband processor 1*m*-20 and the RF processor 1*m*-10 or through the backhaul communicator 1*m*-30. Also, the controller 1*m*-50 may write and read data to and from the storage 1*m*-40. For this purpose, the controller 1*m*-50 may include at least one processor 1*m*-52. Also, the controller 1*m*-50 may control the base station to perform a method of collecting and reporting RRC connection establishment and resume failure information described above. Also, at least one element of the base station may be implemented as a single chip.

The methods according to the embodiments of the disclosure described in claims or specification thereof may be implemented in hardware, software, or a combination of hardware and software.

When the methods are implemented by software, a non-transitory, semi-transitory or transitory computer-readable storage medium storing one or more programs (software modules) may be provided. The one or more programs stored in the non-transitory computer-readable storage medium are configured to be executable by one or more processors included in an electronic device. The one or more programs include instructions that cause an electronic device to execute the methods according to the embodiments of the disclosure set forth in the claims or specification.

Such programs (software modules or software) may be stored in RAM, non-volatile memory such as flash memory, ROM, electrically erasable programmable ROM (EEPROM), a magnetic disc storage device, CD-ROM, a DVD, other types of optical storage devices, or a magnetic cassette. Alternatively, the programs may be stored in a memory which is a combination of some or all of the above storage media. In addition, a plurality of such memories may be included.

Furthermore, the program may be stored in an attachable storage device that may be accessed through communication networks such as the Internet, Intranet, a LAN, a WLAN, or a storage area network (SAN) or a communication network configured in a combination thereof. The storage device may access a device performing the embodiments of the disclosure through an external port. Further, a separate storage device on the communication network may also access the device performing the embodiments of the disclosure.

The embodiments of the disclosure provide an apparatus and method capable of effectively collecting and reporting RRC connection configuration and resume failure information in a wireless communication system.

In the embodiments of the disclosure, an element included in the disclosure is expressed in a singular or plural form depending on the described embodiments of the disclosure. However, singular or plural expressions have been selected properly for a condition provided for convenience of description, and the disclosure is not limited to singular or plural elements, and elements expressed as plural may be configured as a single element or an element expressed as singular may also be configured as plural elements.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. A terminal for transmitting a signal in a wireless communication system, the terminal comprising:
    a transceiver; and
    at least one processor configured to:
        start a timer when a Radio Resource Control (RRC) connection establishment procedure or an RRC connection resume procedure is initiated,
        identify that the timer is expired,
        determine whether at least one of a first condition or a second condition is met, the first condition including a condition that the terminal has connection failure information available in an information container and a registered Public Land Mobile Network (PLMN) does not correspond to a PLMN identity included in the information container, and the second condition including a condition that a current cell is not equal to a cell where connection failure happened,
        in case that at least one of the first condition or the second condition is met, set a count number about connection failure included in the information container to 0, and
        after determining whether at least one of the first condition or the second condition is met, clear contents included in the information container except for the count number about the connection failure.

2. The terminal of claim 1,
    wherein the information container includes connection failure report information and the PLMN identity, and wherein the connection failure report information includes the count number about the connection failure.

3. The terminal of claim 1,
    wherein the PLMN identity and measurement result information about the cell where the connection failure happened are stored in the information container in response to the RRC connection establishment procedure or the RRC connection resume procedure failing.

4. The terminal of claim 3, wherein the measurement result information about the cell where the connection failure happened includes at least one of a global cell identity, reference signal received power (RSRP), or reference signal received quality (RSRQ).

5. The terminal of claim 1, wherein the connection failure information includes at least one of connection establishment failure information or connection resume failure information.

6. The terminal of claim 1, wherein the at least one processor is further configured to:
    transmit, to a base station (BS), an RRC setup request message in an idle mode or an RRC resume request message in an inactive mode,
    receive, from the BS, an RRC setup message,
    enter a connected mode,
    identify that the terminal has the connection failure information available in the information container and the registered PLMN corresponds to the PLMN identity included in the information container,
    transmit, to the BS, an RRC setup complete message including a first indicator indicating that the terminal has available connection failure information,
    receive, from the BS, a terminal information request message including a second indicator to report the connection failure information, and
    in case that the second indicator is set to true, transmit, to the BS, a terminal information response message including connection failure report information including the count number about the connection failure.

7. The terminal of claim 6, wherein the at least one processor is further configured to, after confirming that the terminal information response message is transmitted, discard the connection failure report information included in the information container.

8. The terminal of claim 1, wherein the at least one processor is further configured to:
    select a PLMN from one or more PLMNs included in a PLMN identity list in system information, and
    store a second PLMN identity corresponding to the selected PLMN in the information container.

9. The terminal of claim 1, wherein the at least one processor is further configured to:
    determine whether a second PLMN identity of the registered PLMN is included in the information container, and
    in case that the second PLMN identity of the registered PLMN is not included in the information container, select a PLMN from one or more PLMNs included in a PLMN identity list in system information and store the second PLMN identity corresponding to the selected PLMN in the information container.

10. The terminal of claim 1, wherein the at least one processor is further configured to store a second PLMN identity corresponding to the registered PLMN in the information container without PLMN selection in an inactive mode.

11. A method, performed by a terminal, for transmitting a signal in wireless communication system, the method comprising:
- starting a timer when a Radio Resource Control (RRC) connection establishment procedure or an RRC connection resume procedure is initiated;
- identifying that the timer is expired;
- determining whether at least one of a first condition or a second condition is met, the first condition including a condition that the terminal has connection failure information available in an information container and a registered Public Land Mobile Network (PLMN) does not correspond to a PLMN identity included in the information container, and the second condition including a condition that a current cell is not equal to a cell where connection failure happened;
- in case that at least one of the first condition or the second condition is met, setting a count number about connection failure included in the information container to 0; and
- after determining whether at least one of the first condition or the second condition is met, clearing contents included in the information container except for the count number about the connection failure.

12. The method of claim 11,
- wherein the information container includes connection failure report information and the PLMN identity, and
- wherein the connection failure report information includes the count number about the connection failure.

13. The method of claim 11, wherein the PLMN identity and measurement result information about the cell where the connection failure happened are stored in the information container in response to the RRC connection establishment procedure or the RRC connection resume procedure failing.

14. The method of claim 13, wherein the measurement result information about the cell where the connection failure happened includes at least one of a global cell identity, reference signal received power (RSRP), or reference signal received quality (RSRQ).

15. The method of claim 11, wherein the connection failure information includes at least one of connection establishment failure information or connection resume failure information.

16. The method of claim 11, further comprising:
- transmitting, to a base station (BS), an RRC setup request message in an idle mode or an RRC resume request message in an inactive mode;
- receiving, from the BS, an RRC setup message;
- entering a connected mode;
- identifying that the terminal has the connection failure information available in the information container and the registered PLMN corresponds to the PLMN identity included in the information container;
- transmitting, to the BS, an RRC setup complete message including a first indicator indicating that the terminal has available connection failure information;
- receiving, from the BS, a terminal information request message including a second indicator to report the connection failure information; and
- in case that the second indicator is set to true, transmitting, to the BS, a terminal information response message including connection failure report information including the count number about the connection failure.

17. The method of claim 16, further comprising, after confirming that the terminal information response message is transmitted, discarding the connection failure report information included in the information container.

18. The method of claim 11, further comprising:
- selecting a PLMN from one or more PLMNs included in a PLMN identity list in system information; and
- storing a second PLMN identity corresponding to the selected PLMN in the information container.

19. The method of claim 11, further comprising:
- determining whether a second PLMN identity of the registered PLMN is included in the information container; and
- in case that the second PLMN identity of the registered PLMN is not included in the information container, selecting a PLMN from one or more PLMNs included in a PLMN identity list in system information and storing the second PLMN identity corresponding to the selected PLMN in the information container.

20. The method of claim 11, further comprising storing a second PLMN identity corresponding to the registered PLMN in the information container without PLMN selection in an inactive mode.

* * * * *